(12) United States Patent
Wong et al.

(10) Patent No.: US 11,830,163 B2
(45) Date of Patent: Nov. 28, 2023

(54) METHOD AND SYSTEM FOR IMAGE GENERATION

(71) Applicant: Geomagical Labs, Inc., Mountain View, CA (US)

(72) Inventors: Kevin Wong, Mountain View, CA (US); Qiqin Dai, Mountain View, CA (US); Kaimo Lin, Mountain View, CA (US); Brian Totty, Mountain View, CA (US); Jianfeng Yin, Mountain View, CA (US); Yacine Alami, Mountain View, CA (US); Michael Bernardo, Mountain View, CA (US); Paul Gauthier, Mountain View, CA (US); Philip Guindi, Mountain View, CA (US); Qing Guo, Mountain View, CA (US); Luis Puig Morales, Mountain View, CA (US); Brian Pugh, Mountain View, CA (US); Konstantinos Nektarios Lianos, Mountain View, CA (US); Angus Dorbie, Redwood City, CA (US)

(73) Assignee: Geomagical Labs, Inc., Mountain View, CA (US)

( * ) Notice: Subject to any disclaimer, the term of this patent is extended or adjusted under 35 U.S.C. 154(b) by 533 days.

(21) Appl. No.: 16/918,434

(22) Filed: Jul. 1, 2020

(65) Prior Publication Data

US 2021/0004933 A1 Jan. 7, 2021

Related U.S. Application Data

(60) Provisional application No. 62/869,222, filed on Jul. 1, 2019.

(51) Int. Cl.
*G06T 7/11* (2017.01)
*G06T 3/40* (2006.01)
(Continued)

(52) U.S. Cl.
CPC .......... *G06T 3/4038* (2013.01); *G06T 3/0093* (2013.01); *G06T 7/11* (2017.01);
(Continued)

(58) Field of Classification Search
CPC ............. G06T 7/11; G06T 7/30; G06T 7/174; G06T 7/248
See application file for complete search history.

(56) References Cited

U.S. PATENT DOCUMENTS

| | | |
|---|---|---|
| 5,649,032 A | 7/1997 | Burt et al. |
| 5,963,664 A | 10/1999 | Kumar et al. |
| 6,078,701 A | 6/2000 | Hsu et al. |
| 2010/0097443 A1 | 4/2010 | Lablans |

(Continued)

OTHER PUBLICATIONS

Basic Stitching Pipeline—RIT Panorama App, https://sites.google.com/site/ritpanoramaapp/project-stage-iii, Jun. 19, 2020, 13 pages.

(Continued)

*Primary Examiner* — Myron Wyche
(74) *Attorney, Agent, or Firm* — Amardeep S. Grewal; Reed Smith LLP

(57) ABSTRACT

Systems and methods for generating a panorama image. Captured images are coarsely aligned, and then finely aligned based on a combination of constraint values. The panorama image is generated from the finely aligned images.

21 Claims, 32 Drawing Sheets

100

Obtain a set of images S100

Coarsely align the set of images S200

Finely align the set of images S300

Composite the set of images into a panorama S400

Prepare final panorama for use S500

(51) Int. Cl.
  *G06T 3/00* (2006.01)
  *G06T 7/174* (2017.01)
  *G06T 7/246* (2017.01)
  *G06T 17/20* (2006.01)
  *G06T 7/30* (2017.01)

(52) U.S. Cl.
  CPC .............. *G06T 7/174* (2017.01); *G06T 7/248* (2017.01); *G06T 7/30* (2017.01); *G06T 17/205* (2013.01); *G06T 2207/10028* (2013.01); *G06T 2207/20021* (2013.01)

(56) References Cited

U.S. PATENT DOCUMENTS

| | | | |
|---|---|---|---|
| 2012/0177253 A1* | 7/2012 | Tseng | G06T 3/4038 382/107 |
| 2014/0267833 A1* | 9/2014 | Chen | G06T 5/003 348/239 |
| 2015/0235371 A1 | 8/2015 | Venkataraman et al. | |
| 2016/0142643 A1 | 5/2016 | Jiang et al. | |
| 2018/0082401 A1* | 3/2018 | Bai | G06T 11/60 |
| 2018/0338084 A1* | 11/2018 | Edpalm | H04N 5/23238 |

OTHER PUBLICATIONS

Liu, Feng et al. "Content Preserving Warps for 3D Video Stabilization" ACM Siggraph conference proceedings, 9 pages.
Lyu, Wei et al. "A Survey on Image and Video Stitching" State Key Laboratory of Virtual Reality Technology and Systems, School of Computer Science and Engineering, Beihang University, Beijing 10091, China, Feb. 20, 2020, 36 pages.
Mallick, Satya "Learn OpenCV—Image Alignment (Feature Based) using OpenCV (C++/Python)", Jun. 10, 2020, 19 pages.
Rematas, Konstantinos et al. "Novel Views of Objects from a Single Image" http://homes.cs.washington.edu/krematas/ViewSynethesis/, Aug. 15, 2016, 14 pagess.
Szeliski, Richard "Image Alignment and Stitching: A Tutorial" MSR-TR-2004-92, Technical Report, Dec. 10, 2006, 89 pages.
Xiang et al., "Image Stitching by Line-guided Local Warping with Global Similarity Constraint", State Key Lab, Liesmars, Wuhan University, Wuhan, China, Oct. 31, 2017, 31 pages.
Lai et al. "Real-Time Panoramic Depth Maps from Omni-directional Stereo Images for 6 DoF 1-20 Videos in Virtual Reality", 2019 IEEE Conference on Virtual Reality and 3D User Interfaces, Mar. 27, 2019. Retrieved on Aug. 25, 2020.

* cited by examiner

100

```
┌─────────────────────────────────────────────────────┐
│           Obtain a set of images S100               │
└─────────────────────────────────────────────────────┘

┌─────────────────────────────────────────────────────┐
│         Coarsely align the set of images S200       │
└─────────────────────────────────────────────────────┘

┌─────────────────────────────────────────────────────┐
│          Finely align the set of images S300        │
└─────────────────────────────────────────────────────┘

┌─────────────────────────────────────────────────────┐
│     Composite the set of images into a panorama S400│
└─────────────────────────────────────────────────────┘

┌ ─ ─ ─ ─ ─ ─ ─ ─ ─ ─ ─ ─ ─ ─ ─ ─ ─ ─ ─ ─ ─ ─ ─ ─ ─ ─ ┐
         Prepare final panorama for use S500
└ ─ ─ ─ ─ ─ ─ ─ ─ ─ ─ ─ ─ ─ ─ ─ ─ ─ ─ ─ ─ ─ ─ ─ ─ ─ ─ ┘
```

FIGURE 1A left photo statue on right side of wall art.

right photo statue now on left side of wall art.

closer objects (statue, paint, ladder) float left as the camera moves right.

Apply mesh to image

Map mesh vertices to coarsely align with other images

Locally deform mesh to improve local fine alignment

Coarsely warping

Finely warping

Initial coarse shape $$E_{pointMatch2D}(V^t) = \sum_{i=1}^{N_{2D}} w_i \|\sum_{k=1}^{4} c_k V_k - x_i\|_2^2$$

where $V_k k = 1,2,3,4$ are the 4 vertices around point $x_i$. There are $N_{2D}$ 2D feature points in total.

$$E_{pointMatch3D}(V^t) = \sum_{i=1}^{N_{3D}} w_i \|\sum_{k=1}^{4} c_k V_k - x_i^t\|_2^2$$

where $V_k$ $k = 1,2,3,4$ are the 4 vertices around template point $x_i^t$. There are $N_{3D}$ 3D points/template points in total.

$$E_{sim}(V^t) = \sum_{i=1}^{N_t} \left\| V_a^i - \left( V_b^i + u(V_c^i - V_b^i) + vR_{90}(V_c^i - V_b^i) \right) \right\|_2^2$$

where $N_t$ is the number of total triangles, $R_{90}$ is a 2D 90-degree rotation matrix.

$$E_{line}(V^t) = \sum_{i=1}^{N_l} \sum_{j=1}^{N_k} \|x_{key}^{i,j} - (x_{e1}^i + u^{ij}(x_{e2}^i - x_{e1}^i))\|_2^2$$

$$E_{lineMatch2D}(V^t) = \sum_{i=1}^{N_l} w_i \sum_{j=1}^{N_k} \frac{1}{\sqrt{a^{i^2}+b^{i^2}}} (a^i x_{key}^{i,j}(0) + b^i x_{key}^{i,j}(1) + c^i)$$

$$E_{lineMatch3D}(V^t) = \sum_{i=1}^{N_l} w_l \sum_{j=1}^{N_k} \frac{1}{\sqrt{a^{i^2} + b^{i^2}}} (a^i x_{key}^{i,j}(0) + b^i x_{key}^{i,j}(1) + c^i)$$

METHOD AND SYSTEM FOR IMAGE GENERATION

CROSS-REFERENCE TO RELATED APPLICATIONS

This application claims priority to U.S. Provisional Application No. 62/869,222, filed 1 Jul. 2019, which is incorporated herein in its entirety by this reference.

TECHNICAL FIELD

This invention relates generally to the image generation field, and more specifically to a new and useful method and system for image stitching.

BACKGROUND

Indoor panorama generation is important for indoor visualization, modeling, design, measurement, and entertainment applications, among others. For such applications, the desire for immersive and expansive experiences may require larger fields of view than available with typical cameras and cameraphones. These larger fields of view can be achieved by compositing multiple narrow view images into a larger field image, but challenges caused by parallax with a moving camera must be handled.

The inventors have discovered that no satisfactory parallax-tolerant indoor panorama generation method currently exists for consumers.

Conventional panorama methods are largely intended for outdoor landscape scenes and tend to work poorly for indoor scenes, because the indoor objects are much closer than outdoor objects. This causes large parallax effects with camera translation (see FIG. 4C) that conventional panorama methods cannot accommodate for. For example, using conventional panorama methods on indoor scenes results in alignment errors, broken edges, curving of straight lines, stretched or twisted image sections, among other effects.

Furthermore, indoor panorama methods which require specialized hardware (e.g. motor mount rotors, extreme wide angle cameras, spherical cameras, etc.) that tightly control camera translation (to reduce the parallax effect) cannot be applied to consumer applications, where consumers lack access to such specialized hardware.

As such, there is a need for a panorama-generation method that enables everyday consumers to easily generate parallax-tolerant indoor panoramas. This invention provides such new and useful method and system for parallax-tolerant indoor panorama generation.

BRIEF DESCRIPTION OF THE FIGURES

FIGS. 1A-F are representations of variations of the method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 11:
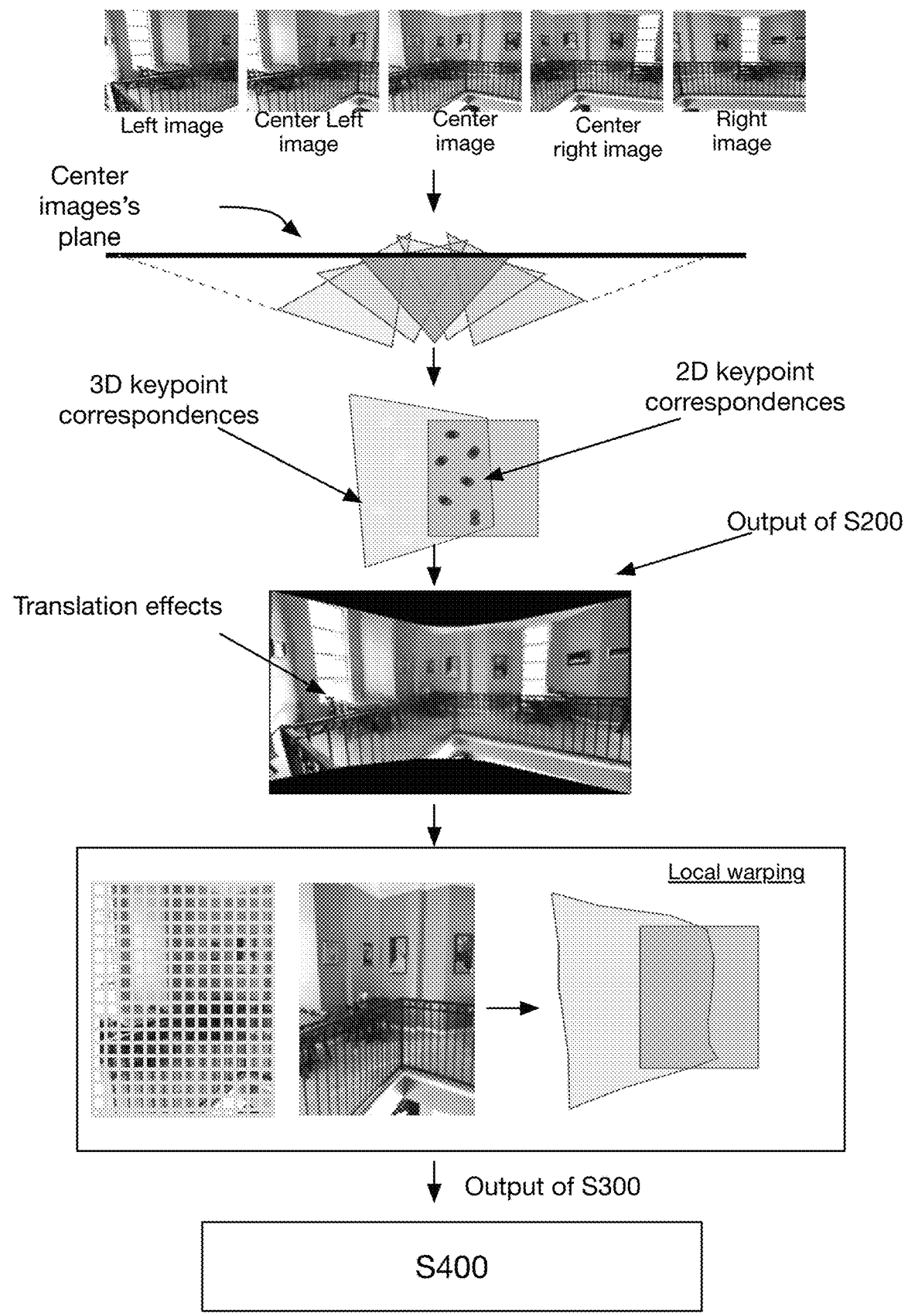
FIG. 11 is a preferred embodiment of the method.

A method for generating a panorama as shown in FIG. 1 preferably includes obtaining a set of images S100, coarsely aligning the set of images S200, finely aligning the set of images S300, compositing the set of images into a panorama S400, and preparing the final panorama for use S500, but can additionally or alternatively include preparing the set of images S150 and any other suitable elements. The method functions to generate panoramas from a set of images as shown in FIG. 11. In variants, the method functions to generate photorealistic indoor panoramas that minimize or eliminate parallax effects, minimizes vanishing point or other geometric distortion, enhances visual appearance, and/or maximizes ease of use or ease of accessibility.

Figure 1B:
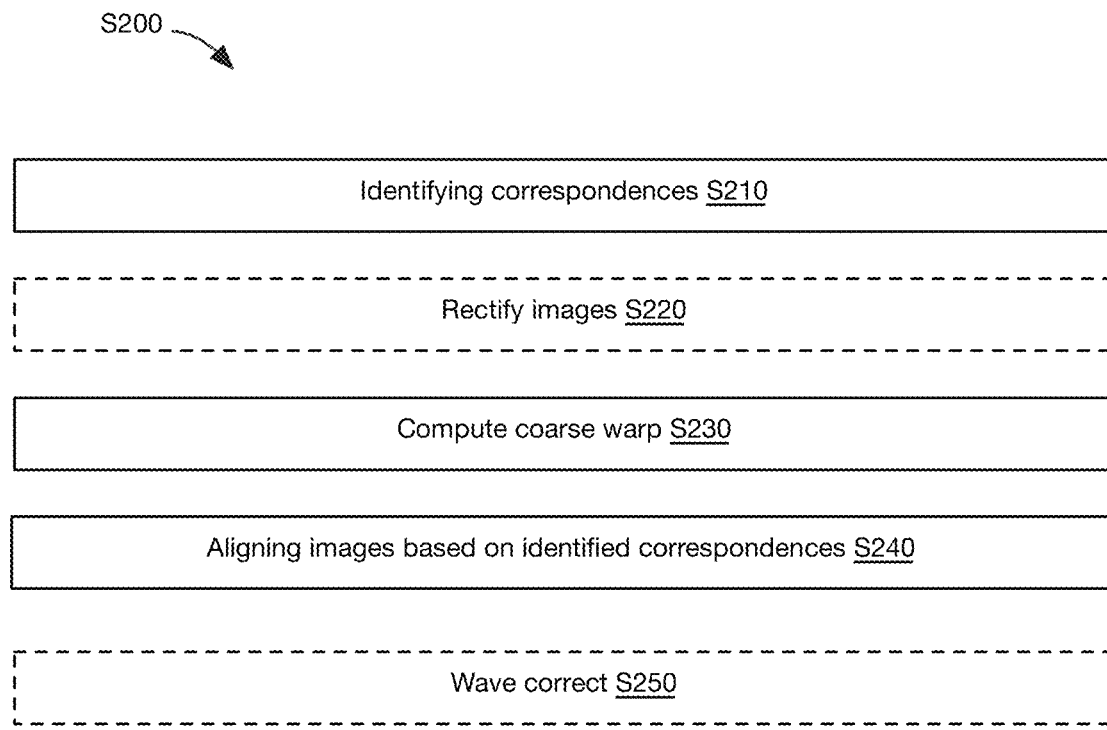
Figure 1C:
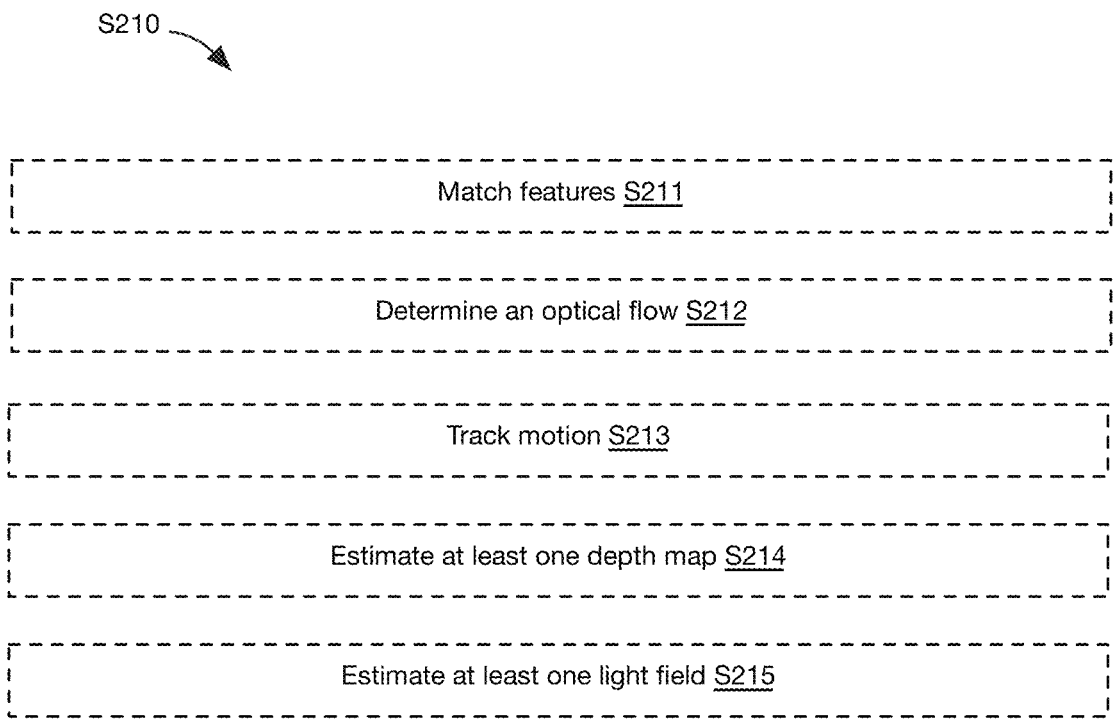
Figure 1D:
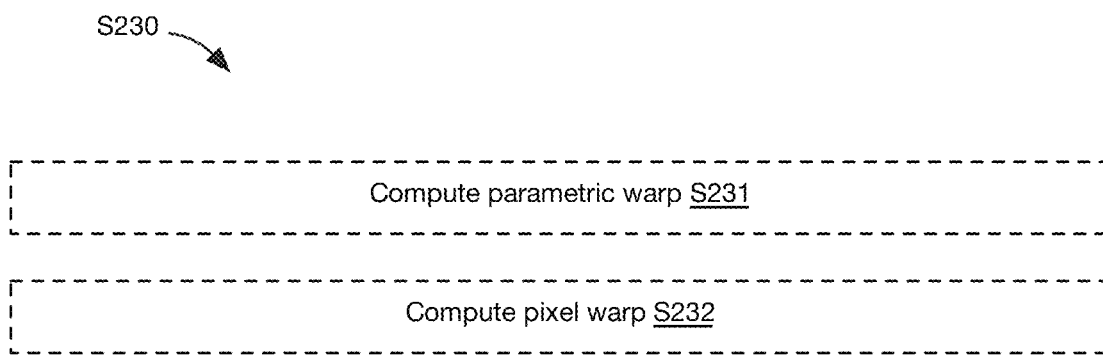
Figure 1E:
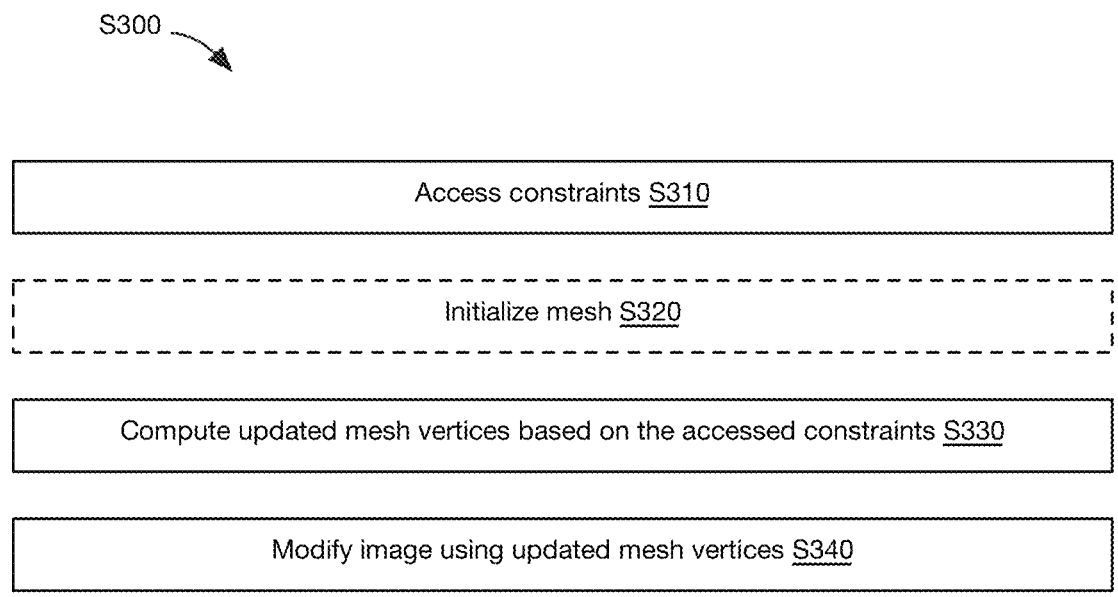
Figure 1F:
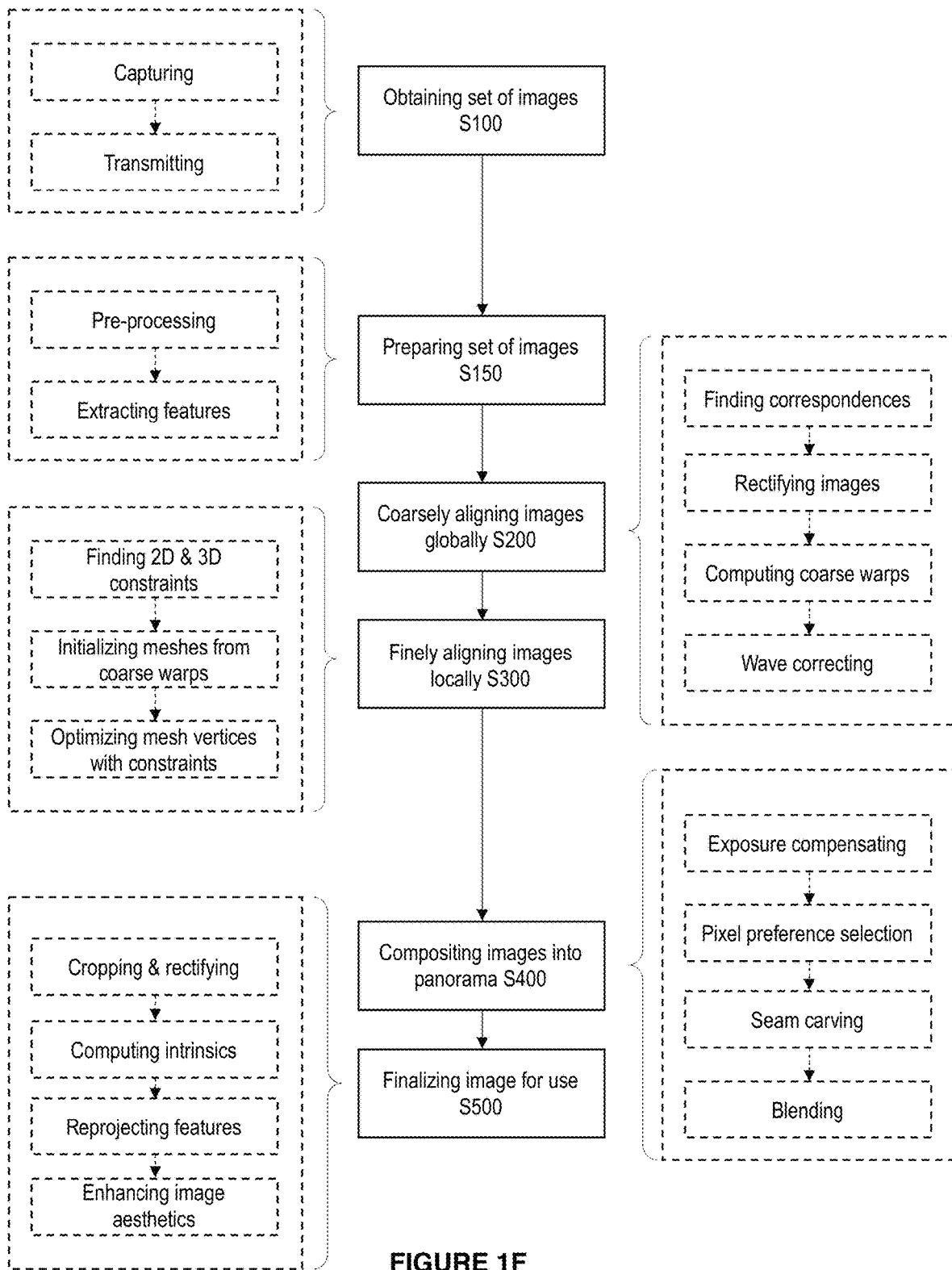
Figure 2:
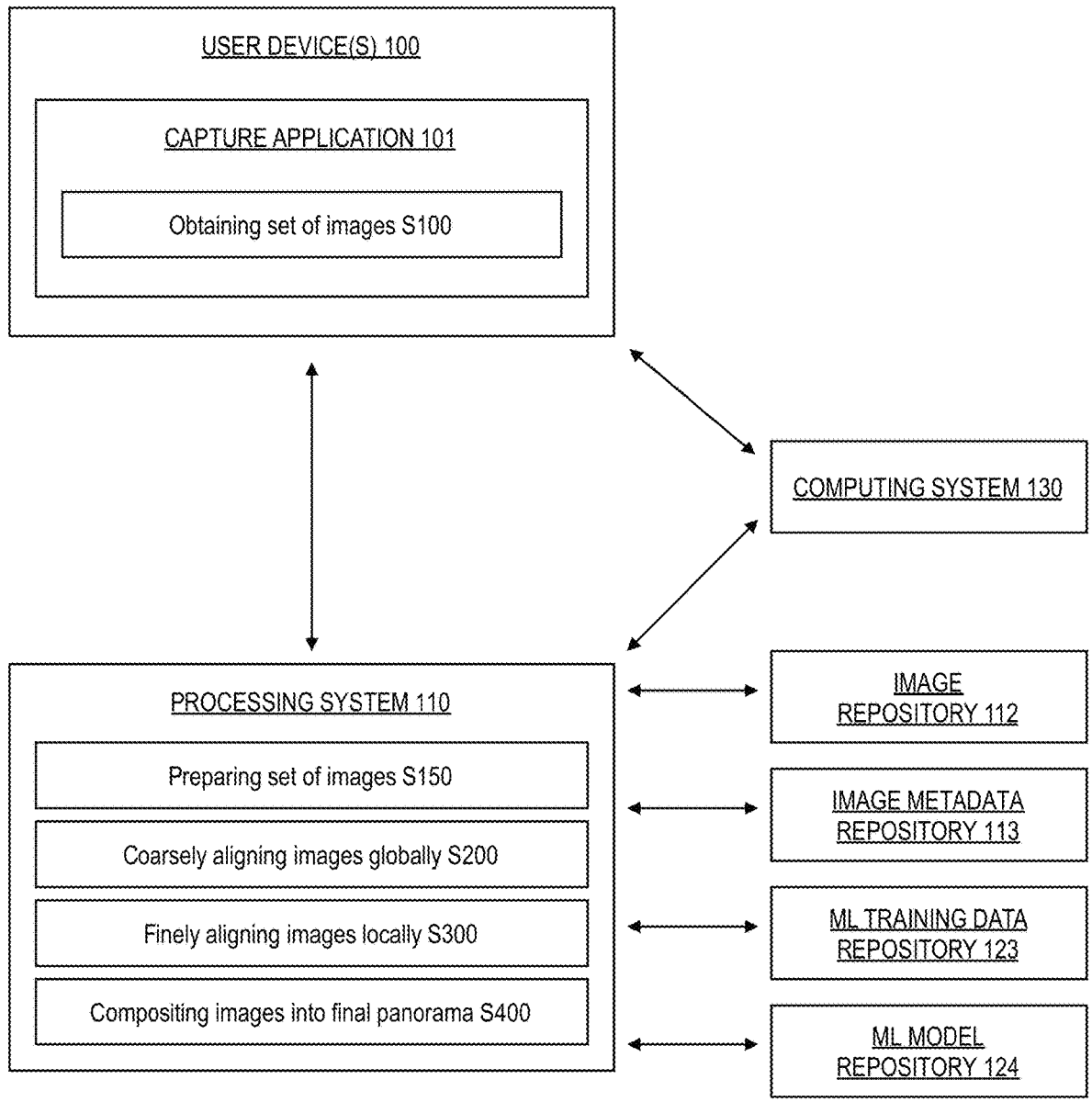
FIG. 2 is a box diagram of the preferred components of the system

The method can be performed by any suitable system, such as the system described herein with respect to FIG. 2. In some variations, the method is performed entirely by a user device (e.g., a mobile device, such as a smartphone). Alternatively, the method is performed by a user device in conjunction with a remote processing system or a remote computing system. In some variations, the method is performed by using data captured (or generated) by using one or more sensors included in the user device. In some implementations, only sensors included in the user device are used to perform the method. However, any suitable sensor can be used to perform the method.

2. Examples

Figure 3:
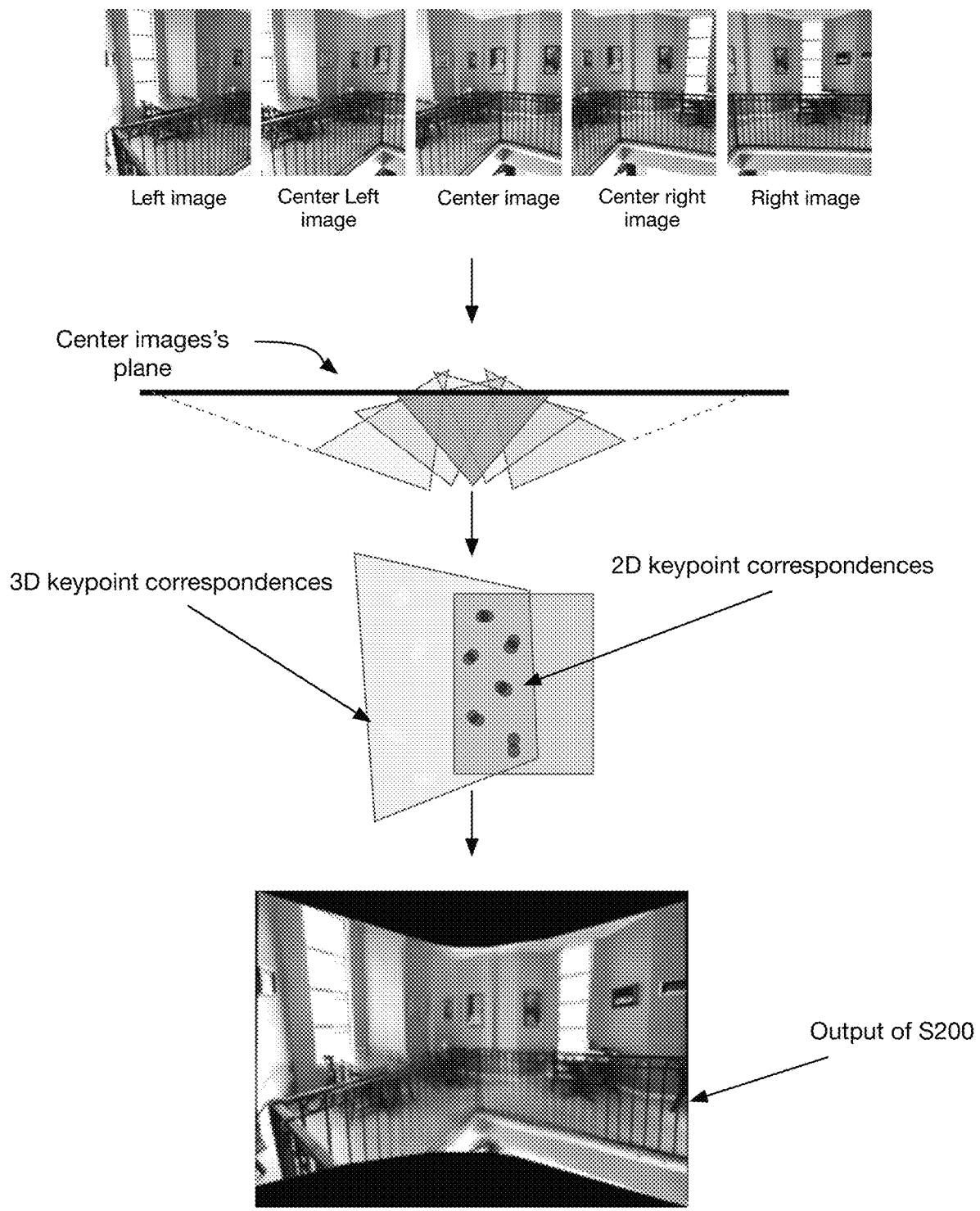
FIG. 3 is a preferred embodiment of S100 and S200, where the set of images in S100 contains five images, the set of images are aligned to the center image's plane, camera pose estimates and three-dimensional and two-dimensional correspondences are found and used for coarse alignment in S200.
Figure 8:
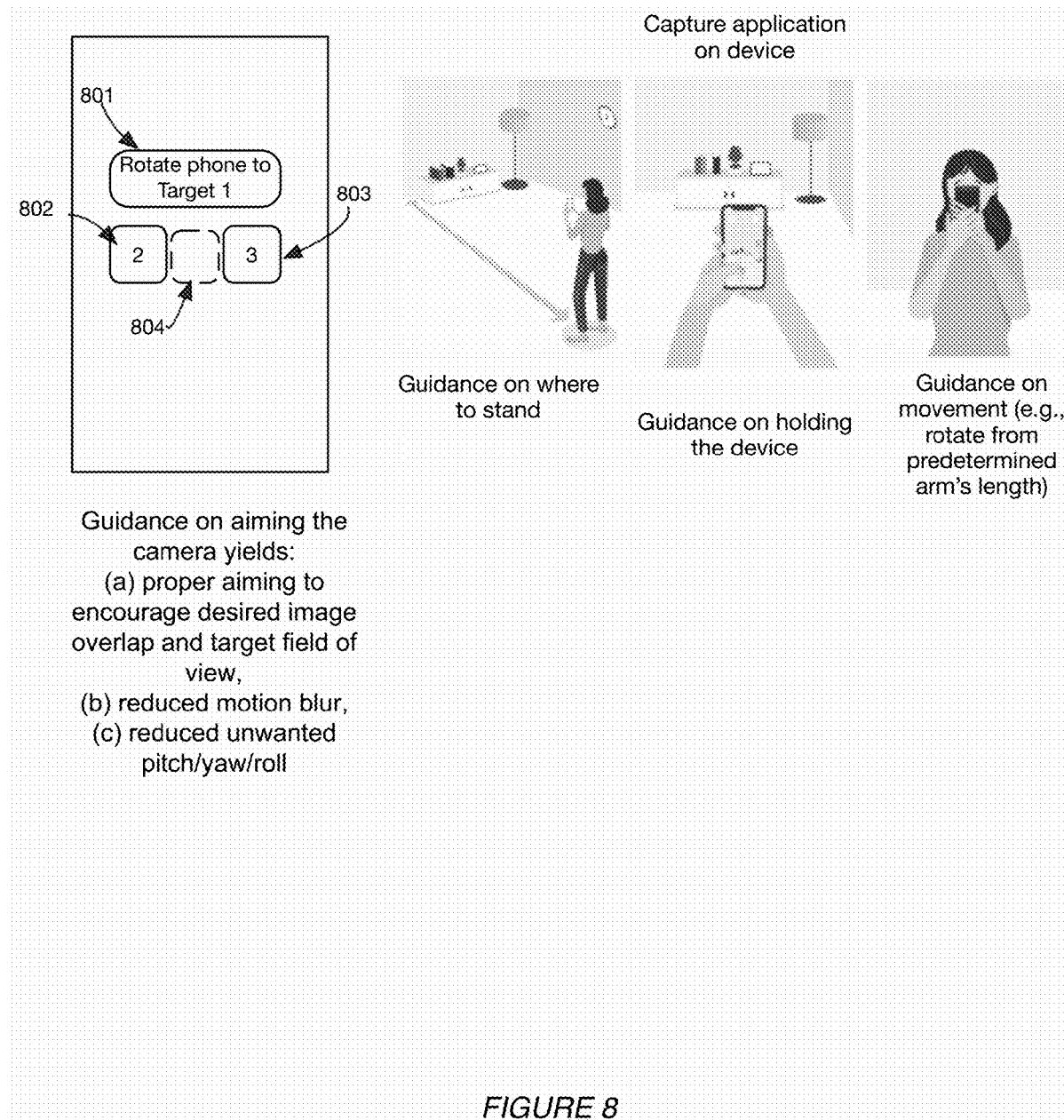
FIG. 8 is an example of guided capture techniques for S100.
Figure 10A:
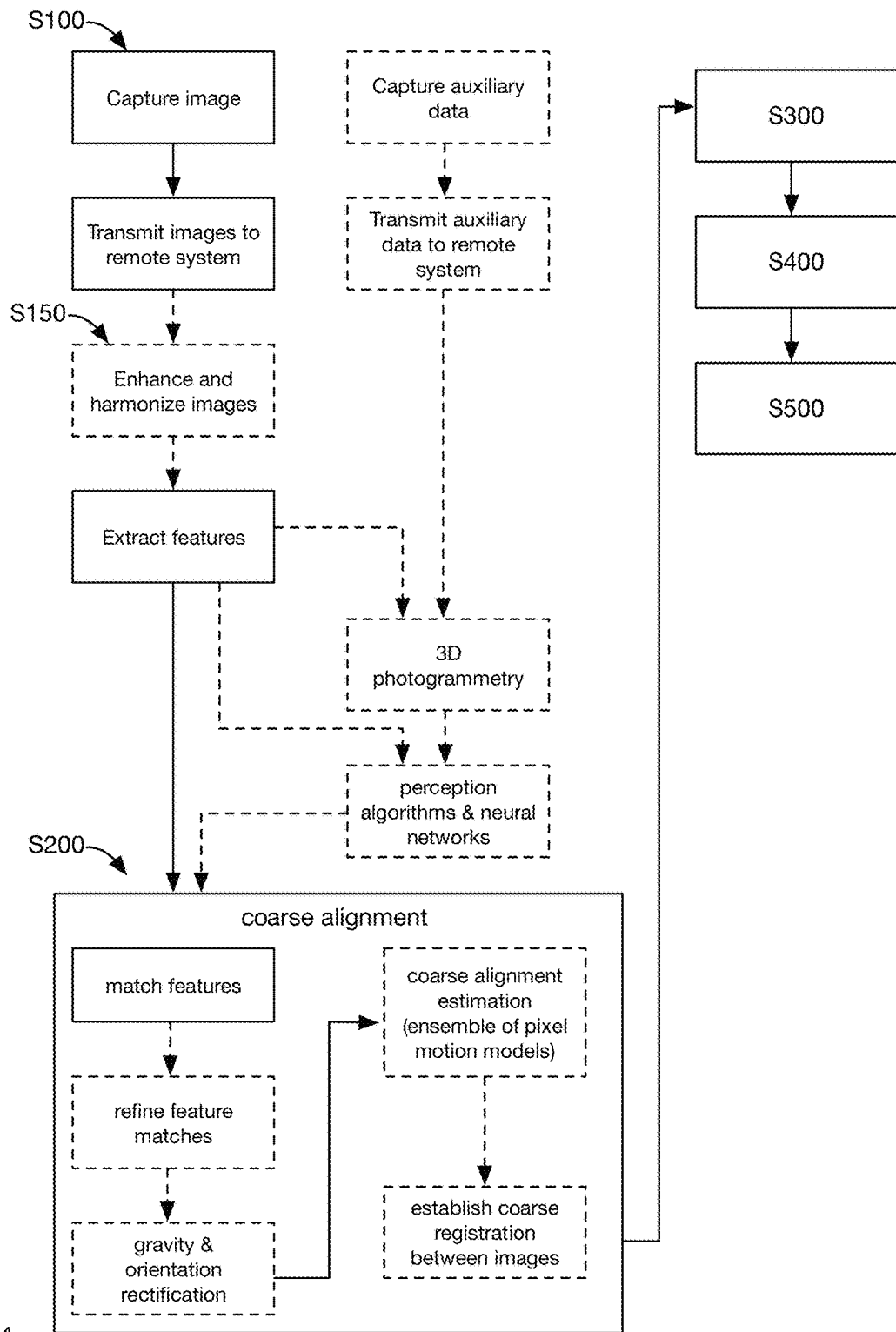
FIG. 10A-B are schematic representations of an example of the method.
Figure 10B:
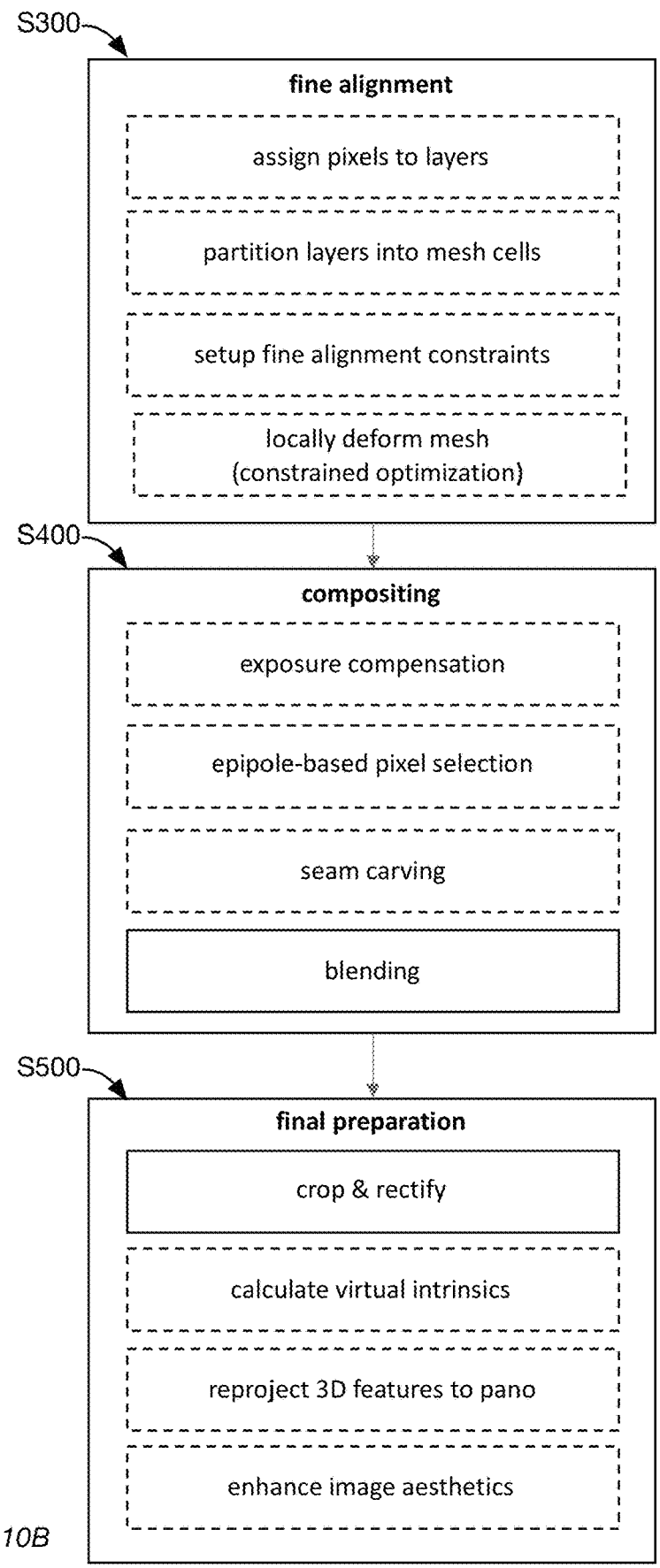

An example embodiment of the method as shown in FIGS. 10A-B and FIG. 11 for generating a panorama can include: obtaining a set of images as shown in FIG. 3 through a guided capture process as shown in FIG. 8 using the capture application(s) of the system, pre-processing one or more images in the set of images, and extracting features from one or more images in the set of images. Extracting features can include two-dimensional features and correspondences, three-dimensional features and correspondences, neural network features, or any other features. The method for generating a panorama can further include aligning the set of images coarsely through a process that includes feature matching and/or optical flow, rotational warping, one or more homography warps, gravity alignment and/or rectification. The coarse alignment process can be performed simultaneously with all images or sequentially (e.g. with respect to a center image and working outwards to adjacent images and correcting in a pairwise fashion until all images have been processed). The method for generating a panorama can further include finely aligning the images locally after coarse alignment through local mesh deformation that includes an energy optimizer (e.g., limited by a set of one or more constraints), applying seam carving to the set of images, compositing the images into a panorama by blending the set of images and cropping the set of images into an appropriate horizontal and vertical field of view (e.g., a predetermined FOV, a calculated FOV, etc.), and computing virtual intrinsics for the virtual panoramic camera image. However, the method can additionally or alternatively be performed using any other suitable elements.

3. Benefits

The method confers several benefits over conventional systems.

First, the method can generate photorealistic indoor panoramas. This can be accomplished using parallax-tolerant methods that minimize camera translation (e.g., using guided image capture), coarsely aligning indoor images (e.g. using camera pose estimates, using two-dimensional feature correspondences, using three-dimensional feature correspondences, etc.), and locally correcting parallax-induced misalignments, but the indoor panoramas can additionally or alternatively be otherwise generated. Furthermore, in some variants, the method can generate wide-angle images that are more photorealistic than conventional systems by leveraging increased cloud processing power and/or longer processing times permitted by some use cases.

Second, the method can be easier to use than other indoor panorama methods by enabling a user to use conventional smartphones to capture sufficient data (e.g., images and/or motion data) for indoor panorama generation. This was previously not possible, because smartphones did not have sufficient processing power or hardware to capture the requisite auxiliary data for each image (e.g., 3D camera tracking), because smartphones did not have the on-board feature extraction and motion analyses methods (e.g., SLAM, ARKit, AR Core, depth mapping algorithms, segmentation algorithms, etc.) to generate the auxiliary data, and because the algorithms were not available to convert smartphone photography into wide 3D models without artifacts.

However, the method can confer any other suitable set of benefits.

4. System

At least a portion of the method is preferably performed using at least one component of a system as shown in FIG. 2. The system can include: one or more devices, one or more capturing applications, one or more computing systems 130, and one or more processing systems no. The system can additionally or alternatively include any other suitable elements such as to generate panoramas using the system. However, the method can additionally or alternatively be performed using any other suitable system.

The system preferably includes one or more devices that function to capture images. Each device is preferably a user device (e.g., computing device such as smartphone, tablet, camera, computer, smartwatch etc.), but can additionally or alternatively include special hardware (e.g., tripod, stick configured to mount the device, etc.).

The device preferably includes one or more sensors that function to capture the images and/or auxiliary data. The sensors can include one or more: cameras (e.g., CCD, CMOS, multispectral, visual range, hyperspectral, stereoscopic, front-facing, rear-facing, etc.), depth sensors (e.g., time of flight (ToF), sonar, radar, lidar, rangefinder such as optical rangefinder, etc.), spatial sensors (e.g., inertial measurement sensors, accelerometer, IMU, gyroscope, altimeter, magnetometer, etc.), location sensors (e.g., GNSS and/or other geopositioning modules, such as receivers for one or more of GPS, etc.; local positioning modules, such as modules enabling techniques such as triangulation, trilateration, multilateration, etc.), audio sensors (e.g., transducer, microphone, etc.), barometers, light sensors, thermal sensors (e.g., temperature and/or heat sensors), and/or any other suitable sensors. In examples, the camera(s) can have image sensors with 5 MP or more; 7 MP or more; 12 MP or more; or have any suitable number of megapixels or resultant resolution. In examples, the camera(s) can have an f-stop value of 1 or less, 1 or more, between 1 and 5, 5 or less, or any other suitable f-stop value and/or aperture.

The device additionally or alternatively includes one or more power sources. The power source preferably includes a battery, but can additionally or alternatively include a capacitor (e.g., to facilitate fast discharging in combination with a battery), a fuel cell with a fuel source (e.g., metal hydride), a thermal energy converter (e.g., thermionic converter, thermoelectric converter, mechanical heat engine, etc.) optionally with a heat source (e.g., radioactive material, fuel and burner, etc.), a mechanical energy converter (e.g., vibrational energy harvester), a solar energy converter, and/or any other suitable power source.

The device additionally or alternatively includes one or more computer readable media. The computer readable media is preferably RAMs and ROMs, but can additionally or alternatively include flash memory, EEPROMs, optical devices (CD or DVD), hard drives, floppy drives, or any suitable storage device.

The device additionally or alternatively includes one or more communication modules (e.g., wireless communication module). The communication modules can include long-range communication modules (e.g., supporting long-range wireless protocols), short-range communication modules (e.g., supporting short-range wireless protocols), and/or any other suitable communication modules. The communication modules can include cellular radios (e.g., broadband cellular network radios), such as radios operable to communicate using 3G, 4G, and/or 5G technology, Wi-Fi radios, Bluetooth (e.g., BTLE) radios, NFC modules (e.g., active NFC, passive NFC), Zigbee radios, Z-wave radios, Thread radios, wired communication modules (e.g., wired interfaces such as USB interfaces), and/or any other suitable communication modules. However, the device can additionally or alternatively include any other suitable elements.

The system preferably includes one or more capture applications that function to control the device, more preferably to guide image capture. The capture application can additionally function to capture auxiliary data associated with the image and/or image capture process, such as attributes captured by the device. The attributes can preferably include two-dimensional visual features (e.g., pixels, patches, keypoints, edges, line segments, blobs, learned features, etc.), three-dimensional visual features (e.g., depth maps, point clouds, signed-distance fields, meshes, planes, learned features, etc.), poses (e.g., three degrees of freedom, six degrees of freedom, etc.), kinematics data (e.g. device orientation, gravity, inertial measurement unit data), timestamps, camera sensor metadata (e.g. ISO settings, white balance, ISO, shutter speeds, EV offsets, metering data, camera intrinsics, illumination data, etc.), but can additionally or alternatively include or any other suitable feature. The capture application can be one or more native applications executing on the user device, but additionally or alternatively include a browser application, a cross-platform application, or be any other suitable program.

The system preferably includes one or more computing systems. The computing systems can include one or more remote computing systems (e.g., network-connected servers), which are preferably operable to communicate with and/or control the device and processing system (e.g., via one or more communication modules, preferably wireless communication modules). The computing systems can additionally or alternatively include device processing systems (e.g., computing systems on-board the device). The computing system can be operable to communicate directly with the capture application and the device (e.g., via one or more communication modules, preferably wireless communication modules), but can additionally or alternatively communicate with the capture application and device via one or more other computing systems (e.g., remote computing system) and/or in any other suitable manner (and/or not communicate with the capture application and device). However, the system can include any suitable set of computing systems.

The system preferably includes one or more processing systems that function to process images captured by the capture application into the panorama. The processing system can include one or more modules, wherein each module can be specific to a method process, or perform multiple method processes. The modules for a given method instance can be executed in parallel, in sequence, or in any suitable order. The modules for multiple method instances can be executed in parallel, in batches, in sequence (e.g., scheduled), or in any suitable order. The modules can include coarse alignment, fine alignment, pre-processing, seam carving, compositing, blending, novel view synthesis, or any other suitable process. The processing system can be entirely or partially executed on: the computing system, on only the remote computing system, on only the device processing system, or on any other suitable computing system.

The processing system can optionally access one or more repositories as shown in FIG. 2. The repositories can include one or more training data repositories 123, image repositories 112, image metadata repositories 113, model repositories 124 (e.g., parameters learned from neural networks, regressions, machine learning tools, etc.), constraint repositories (e.g., received from a user, learned, etc.), or any other suitable set of repositories.

However, the processing system can additionally or alternatively include any other suitable elements.

5. Method 5.1 Obtaining a set of images.

The method preferably includes obtaining a set of images S100, which functions to provide base data for a generated panorama. S100 can include capturing, retrieving, sampling, generating, or otherwise determining images from a camera (e.g. device such as a user device), database, or any other suitable determination element. The method can additionally or alternatively include obtaining metadata (e.g. camera settings, camera kinematics estimates, etc.) associated with a respective image.

S100 is preferably performed before coarse alignment and/or local alignment, but can additionally or alternatively be performed contemporaneously. S100 can be performed during a capturing period. The capturing period can include one or more iterations of S100. For example, the capturing period can produce one or more sets of images (e.g. real, synthetic, generated, virtual, etc.). S100 can be performed on schedule and/or at any suitable time.

S100 is preferably performed by the user device, but can additionally or alternatively be performed partially or entirely by one or more components of the system (e.g. device, computing system), by an entity, or by any other suitable component. When the images are obtained (e.g., captured) by the user device (e.g., by the capture application), the images and/or any associated data can be transmitted from the device to the computing system (e.g., remote computing system) either directly or indirectly (e.g., via an intermediary). However, S100 can be otherwise performed by any suitable system.

The set of images preferably includes two or more images as shown in FIG. 3, but can additionally or alternatively include one image, five images, or any suitable number of images. The images of a set of images can share a common: scene (e.g., be segments of the same scene, include overlapping segments, etc.), rotation, translation, quality, alignment, be unrelated, or have any other suitable relationship. An image of a set of images can have one or more subsets of images (e.g. repeat images of the same scene, close-up view of an element in the scene, cropped pieces of the captured scene, or any other suitable characteristic).

A set of images preferably capture a scene as shown in FIG. 8 but can additionally or alternatively capture an entity, an object, or any other suitable element. The scene is preferably indoor (e.g., a room), but can additionally or alternatively be an outdoor scene, a transition from indoor to outdoor, a transition from outdoor to indoor, or any other suitable scene. The sets of images can depict the same scene, but additionally or alternatively can depict different scenes, overlapping scenes, adjacent scenes, or any other suitable scene. For example, a first set of images could capture to a cooking space (e.g., kitchen, commercial kitchen, kitchenette, cookhouse, galley, etc.) and a second set of images could capture a communal space (e.g., living area, work area, dining area, lounge, reception area, etc.). The images preferably capture adjacent, overlapping regions of the scene but can additionally or alternatively capture non-adjacent regions of the scene, non-overlapping regions of the scene, or any other suitable configuration of the scene.

Each image preferably overlaps a sufficient section (e.g., 50% of the pixels, 30% of the pixels, or any other suitably sufficient overlap) of another image included in the set (e.g., preferably the one or more adjacent images, or any other suitable image). Additionally or alternatively, each sequential image pair can share an overlapping section of the scene (e.g., 0.5 meter overlap at 1 meter distance, 2 meter overlap at 1 meter distance, etc.), or have any other suitable overlap. Images of a set preferably cooperatively capture a continuous region of the scene (e.g., a horizontal region, a vertical region, a rectangular region, a spherical region, or any other suitable region). Images of a set preferably collectively cover a horizontal and vertical field of view suitably wide to cover the desired scene area without missing imagery (for example, at least 80 degree field of view horizontally and 57 degrees vertically, but can additionally or alternatively cover a larger, smaller, or any other suitable field of view. An image of a set preferably contains at least one element or feature that is present in at least one other image in the set, but can additionally or alternatively include no shared elements or features.

For example, a first image in the set of images can depict a first subregion of a scene. A second image in the set of images can depict the first subregion of a scene, a second subregion of a scene, a portion of the first and a portion of the second subregions of the scene, or any other suitable scene.

The images of a set of images can be captured in any arrangement (e.g., 3×3 mosaic of landscape images, 4×2 mosaic of portrait images. etc.), camera orientation (e.g., 5 horizontal portrait images, 7 horizontal portrait images, 3 vertical landscape images, etc.), or can be otherwise captured.

Each set of images is preferably oriented about an axis of rotation for ease of user capture. The axis of rotation is preferably the vertical or horizontal axis through the camera lens, the vertical or horizontal axis through the capture device body, or the vector representing gravity. However, the images can be additionally or alternatively oriented in any other suitable rotation. Images within a set of images are preferably captured by rotating about an axis of the image sensor with minimal translation of the axis. However, the rotational axis can alternatively be shifted laterally, vertically, and/or in depth as images are captured. In the latter variant, the different centers of rotations can be aligned in subsequent processes or otherwise managed.

The images of a set of images can have positional translation between adjacent images in addition to rotation, but the positional translation can additionally or alternatively be between the image and any other suitable image. The positional translation between any pair of images is preferably less than a predetermined amount (e.g., less than 2 cm, less than 5 cm, less than 10 cm, etc.), but additionally or alternatively be more than a predetermined amount. A maximum positional translation between any pair of images is preferably less than a predetermined amount (e.g., less than 5 cm), and/or less than a variable amount (e.g. based on the distances of objects in the scene), but can additionally or alternatively be relaxed (e.g. more than 5 m) to ensure that a different angle of the room is captured, for purposes of photogrammetry or depth/edge estimation, or any other reason. However, an image included in the set of images can additionally or alternatively relate to another image in the set of images in any other suitable relationship.

Each set of images is preferably of a predetermined quality (e.g. measured by image characteristics, level of accuracy, etc.). Predetermined quality can relate to the level of accuracy in which the visual sensors of the system capture, process, store, compress, transmit, and display signals that form an image but can additionally or alternatively relate to any other suitable elements that can function to process images. Image quality is preferably maintained by taking multiple images of the same region of a scene, using automatic features of a visual sensor to measure and adjust characteristics of an image (e.g., white balance, exposure, noise, focus, etc.), but additionally or alternatively include using manual feature of a visual sensor to measure and adjust characteristics of an image, or by any other suitable for method for ensuring sufficient quality.

An image of a set of images can have one or more characteristics, such as camera settings, positional information, image data structures, relationships between the image and the subject (e.g., room), metadata, or additionally or alternatively any other suitable characteristics.

An image of a set of images can have one or more image data structures. The image data structure is preferably optical (e.g., photographs, real images), but can additionally or alternatively include synthetic images, video frames, live images, or any other suitable data structure. Synthetic images can be generated using computer graphics techniques (e,g, CGI, etc.), virtual methods (e.g., capturing a scene in a virtual world), manual methods (e.g. combining one or more natural images and/or models), heuristics (e.g., cropping predetermined image segments), learning methods (e.g., generative adversarial networks, etc.), or any other suitable generation technique. For example, a generative adversarial network could generate a new living space similar to the living spaces that the network has seen in training data. However, an image of a set of images can additionally or alternatively have any other suitable data structure.

Each image of a set of images can be associated with metadata (auxiliary data). Additionally or alternatively, the image set itself can be associated with metadata. The metadata can include an image index (e.g., from the guided capture, such as the image's position within the guided capture; the first image, the second image, the middle image, etc.; predetermined panorama position, etc.), time, location, camera settings (e.g. ISO, shutter speed, aperture, focus settings, sensor gain, noise characteristics, light estimation, EV-offset, pixel motion, camera model, sharpness, etc.), two-dimensional features, three-dimensional features, optical flow outputs (e.g., estimated camera motion between images, estimated camera motion during image capture, etc.), AR and/or SLAM and/or visual-inertial odometry outputs (e.g., three-dimensional poses, six-dimensional poses, pose graphs, maps, gravity vectors, horizons, and/or photogrammetry, etc.), but additionally or alternatively include any other suitable metadata.

S100 can include obtaining one set of images, but additionally or alternatively include obtaining two or more sets of images.

Figures 4A, 4B:
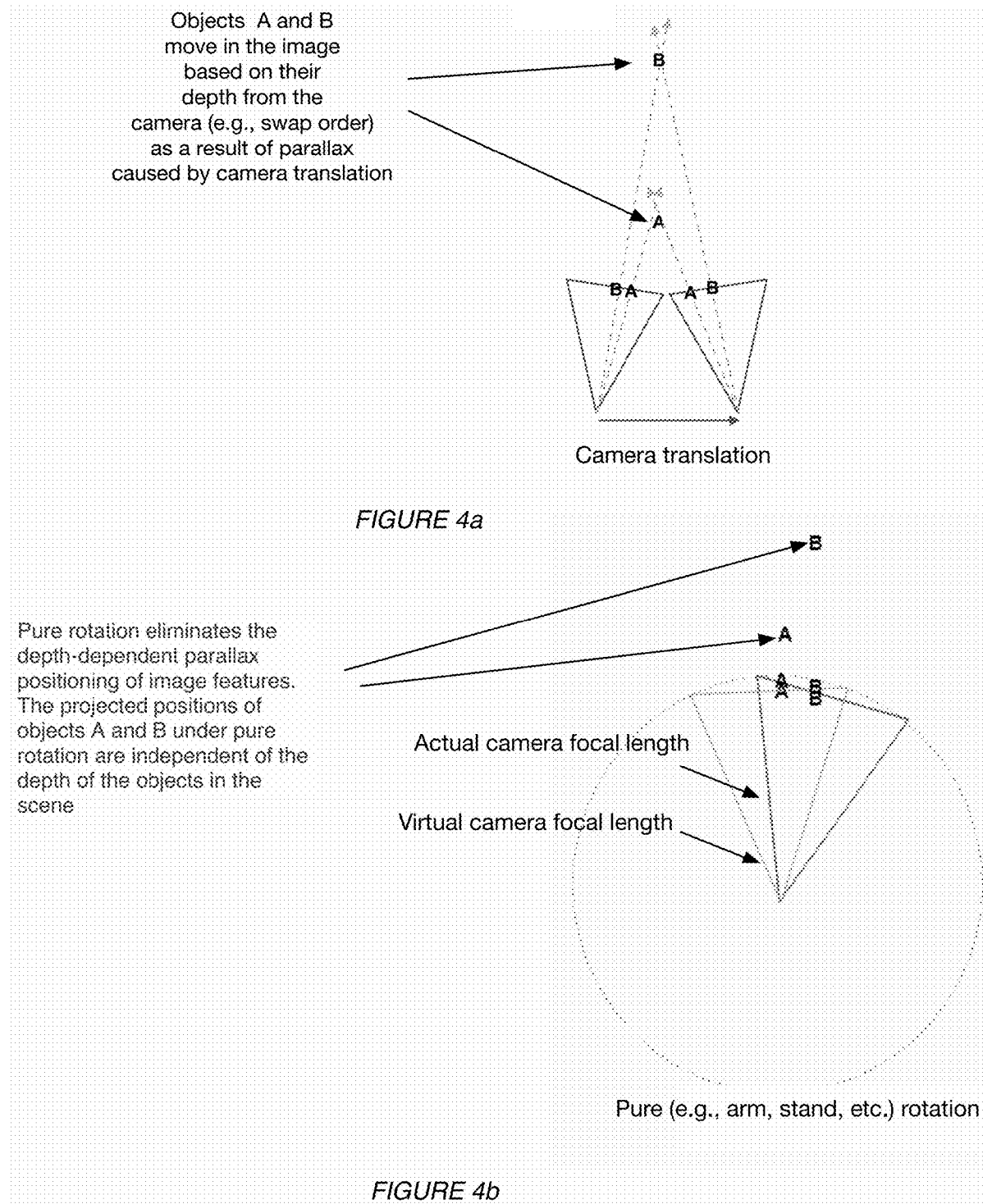
FIGS. 4A-C depict parallax caused by camera translation, and why rotation is parallax-free.
Figure 4C:
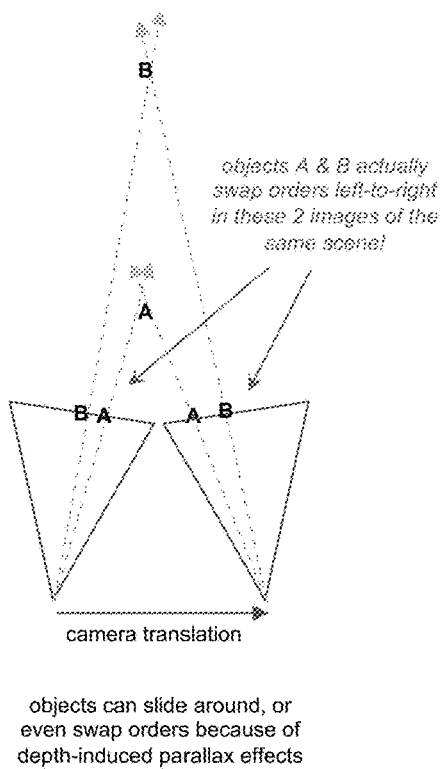
Figure 4C:
Figure 4C:

In one variation, S100 is achieved through guided capture using the capture application as shown in FIG. 8. Guided capture preferably functions to minimize translation as shown in FIG. 4a encourage optimal scene coverage and composition, encourage optimal image overlap, and maintain desired camera pitch and/or roll, but could additionally or alternatively function to help the user capture images. The capture application can be controlled by an entity (e.g., user), a rotating stand that the device can be adhered to, or any other suitable operator. Guided capture can be performed by the device or any other suitable device. Guidance can be audio, visual (e.g., displayed on the device display, displayed on a second device display, etc.), haptic, or any other suitable guidance method as shown in FIG. 8. Guided capture can include using visual and inertial guidance to control how the user aims the camera (e.g., image centering targets, timers, etc.), provide haptic feedback when the user is in the right target (e.g. produce a thump or vibration when docked in the proper position, etc.), warn if there is too much translation (e.g., translation beyond a threshold distance), warn if the camera is tilted too far in any number of dimensions, warn if the camera is moving, warn if the lighting conditions are too dark or bright, but can additionally or alternatively include any other technique to guide capture.

In a first example, guided capture can include visual guides (e.g., 802, 803) (e.g., targets, dots, arrows, numbers, etc.) for where the next image should be centered as shown in FIG. 8. In a second example, guided capture can include instructing the user to be as still as possible when capturing the image and/or detecting and warning about excessive motion. In a third example, guided capture can include instructing the user to align a guidance cursor (e.g., 804) with a target (e.g., 802, 803) and hold still for a period of time during which time photo(s) are captured. In a fourth example, guided capture can include instructing the user to rotate the phone about the camera vertical axis and/or phone vertical axis and/or gravity axis (e.g., using one hand, two hands, a stick, etc.). In a fifth example, guided capture can instruct a user to cradle the phone in two hands and pivot around the center axis of the phone (i.e. a two-handed pivot). In a sixth example, guided capture can include instructing the user to pivot the device slowly in two hands in order to limit translational motion. In a seventh example, guided capture can include rejecting an image or docking position if detected translation falls above a threshold. In an eighth example, guided capture can include instructing the user to properly orient the camera to capture a particular horizontal and vertical field of view with desired overlap. In a ninth example, guided capture can include instructing the user to capture as much of the area of interest (e.g. room) as desired and/or possible. In a tenth example, guided capture can include instructing the user to capture meaningful features, such as the floor and/or dominant wall and/or ceiling, and/or wall-floor seam, within the image frame. In an eleventh example, guided capture can include instructing the user via auditory instructions. In a twelfth example, guided capture can include instructing the user to hold the phone out and to rotate the phone around a pivot point from a predetermined distance (e.g., elbows extended from body to 90 degrees, elbows fully extended, rotate from the shoulder, etc.).

In some variations, guided capture includes capturing video (e.g., by using an image sensor of a mobile device), displaying the video in real-time (e.g., with a display device of the mobile device), and superimposing image capture guidance information onto the displayed video. The image capture guidance information can include one or more of: text describing suggested user movement of the mobile device during capturing of the video (e.g., 80i shown in FIG. 8); a visual guide (e.g., an image centering target) for where the next image should be centered (e.g., 802, 803); and a guidance cursor (e.g., 804). However, any suitable image capture guidance information can be displayed. In some variations, each image centering target is associated with a respective image index. In a first implementation, image centering targets are displayed during image capture, and each target is assigned an image index that identifies the relative positions of each of the targets. For example, for five targets arranged in a horizontal row, each target is assigned an index that identifies the target's arrangement within the row (e.g., a column within the row). As another example, for nine targets arranged in a 3×3 matrix, each target is assigned an index that identifies the target's arrangement within the matrix (e.g., a row and column within the matrix). In some implementations, in response to the image sensor being positioned such that an image centering target is centered within a captured video frame, an image is captured (e.g., automatically, in response to user input). The captured images do not include the superimposed image capture guidance information (e.g., image centering targets), which is displayed merely as a guide to aid in capturing an image of a real-world scene. In a first example, images are captured in order, and an image is captured when the next image centering target is centered. In a second example, images can be captured in any order, and an image is captured when any image centering target is centered. In some implementations, for each captured image, an IMU (e.g., of a mobile device that captures the images) captures IMU data the image when it is captured.

In some implementations, for at least one captured image, an image index of a superimposed image centering target (that is centered in the scene captured by the image) is assigned to the image. By virtue of the assigned image indexes, a center image in the set of captured images is identified.

Figure 12A:
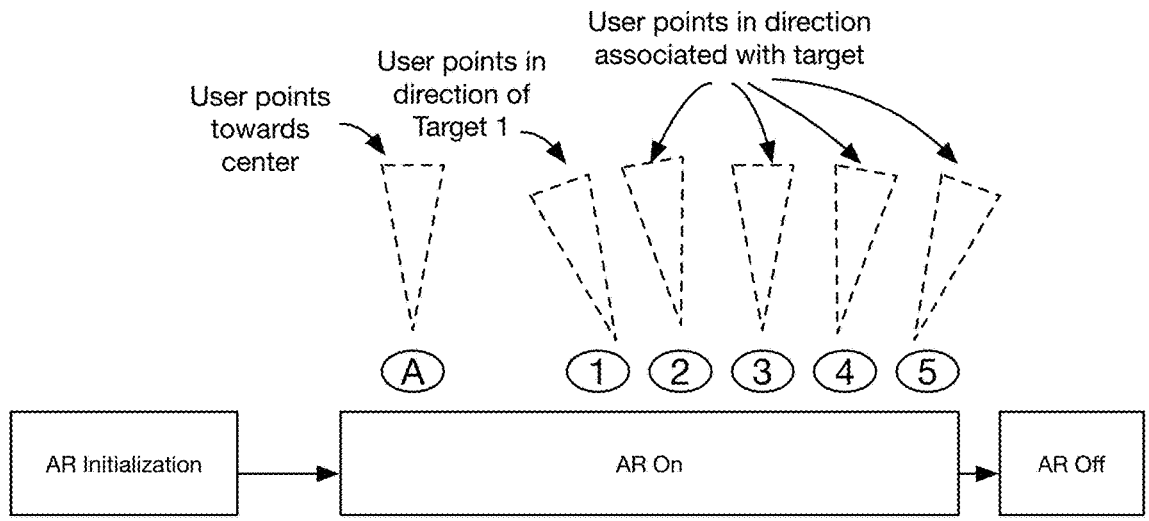
FIG. 12A is a variant of S100 where on-device AR tracking capabilities are used to assign AR camera poses to each image for a panorama.
Figure 12B:
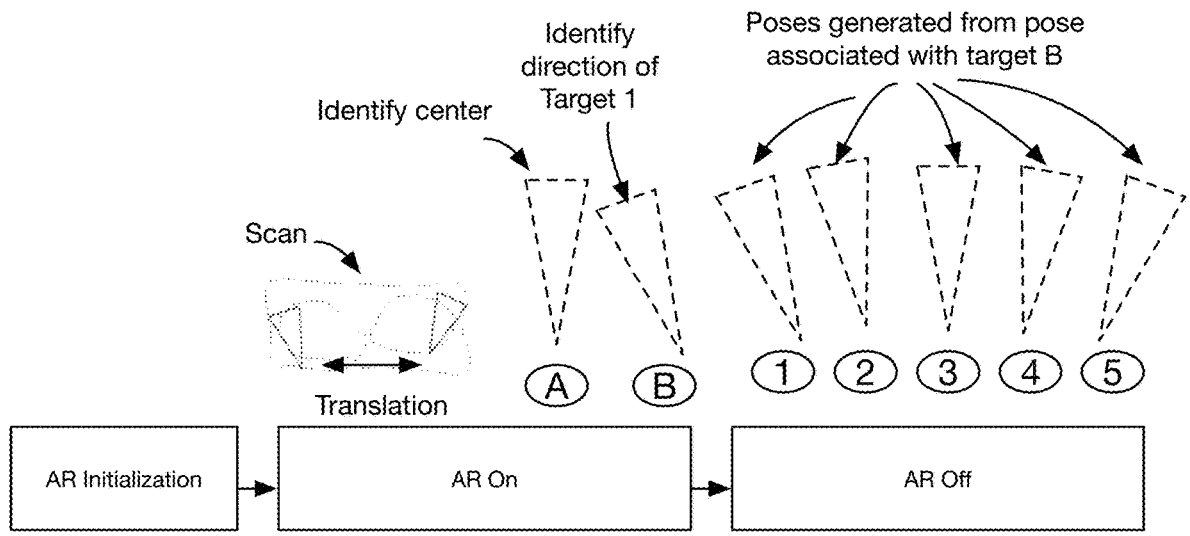
FIG. 12B is a variant of S100 where on-device AR tracking capabilities are used to collect imagery and camera poses for use in photogrammetry, and where pose estimates are associated with still photos using recent AR tracking info and gyroscope rotations.

S100 can add additionally or alternatively include estimating camera positional information using inertial kinematics, visual odometry, visual-inertial odometry, SLAM, AR, photogrammetry, or other techniques. In one example, as sketched in FIG. 12a, guided capture can initialize an AR tracking system, and use it to guide capture but also to associate camera pose estimates and/or features with captured images. In a second example, as sketched in FIG. 12b, guided capture can encourage the user to move the device in an intentional scanning motion to improve the quality of AR pose estimates. In a third example, as sketched in FIG. 12b, guided capture can associate recent camera pose estimates with still photos, optionally using gyro rotations to augment the last seen AR pose estimate, for use by still photography capture modes that do not support active AR tracking. Such hybrid AR and still methods can offer the odometry and features of AR methods along with the visual quality of still photos.

S100 can additionally or alternatively include transmitting images to the processing system. Transmitting data to the processing system is preferably performed while images are captured by the device, or shortly thereafter, but can additionally be streamed in the background, or alternatively at any other suitable time (e.g. when internet connectivity has been reestablished). Transmitting data to the processing system is preferably used after the images have been obtained, in response to internet connectivity activation, in response to receipt of payment, or any other triggering event that gives access to a set of images or additionally or alternatively other suitable data. Transmitting data to the processing system can be performed by the wireless communication system (e.g. long range, short range) or by any other transmission system. Transmitting data to the processing system can include images, metadata, three-dimensional motion data, but additionally or alternatively include any other suitable data.

S100 can additionally or alternatively include pre-processing the images. Pre-processing the images preferably functions to improve visual attributes of the images so they are visually more appealing and/or more consistent so they appear to have come from a single capture (e.g., shot), to improve the quality of panoramic stitching and/or to improve the success of algorithms processing the images. Pre-processing the images is preferably performed before aligning the images globally, aligning images locally, and compositing the images, but can additionally or alternatively be done during or after any of the listed processes. Pre-processing the images can include undistorting images, unrotating images, improving visual attributes of the images (e.g., filtering, contrast, brightness, histogram equalization, clarity, glare, sharpness, exposure, white balance, tone, noise reduction, motion stabilization, deblurring, etc.), but additionally or alternatively can include cropping one or more of the images or any other suitable process.

Figure 9A:
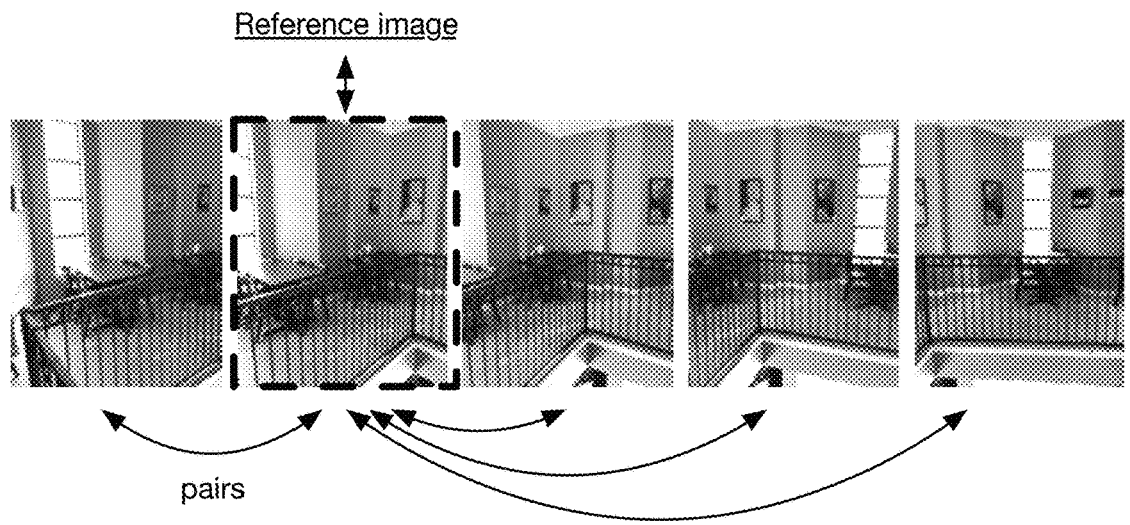
FIG. 9A is a variant of applying S200, S300, and S400 to S100.
Figure 9B:
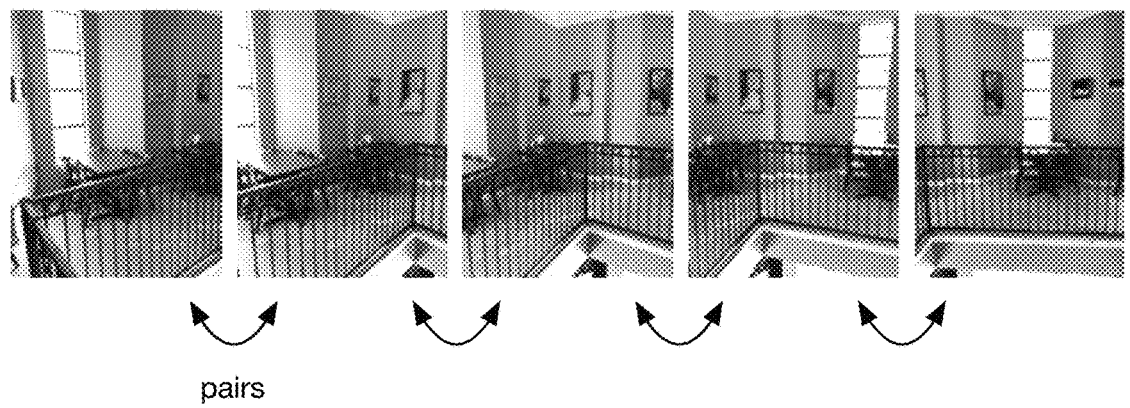
FIG. 9B is a variant of applying S200, S300, and S400 to S100.
Figure 9C:
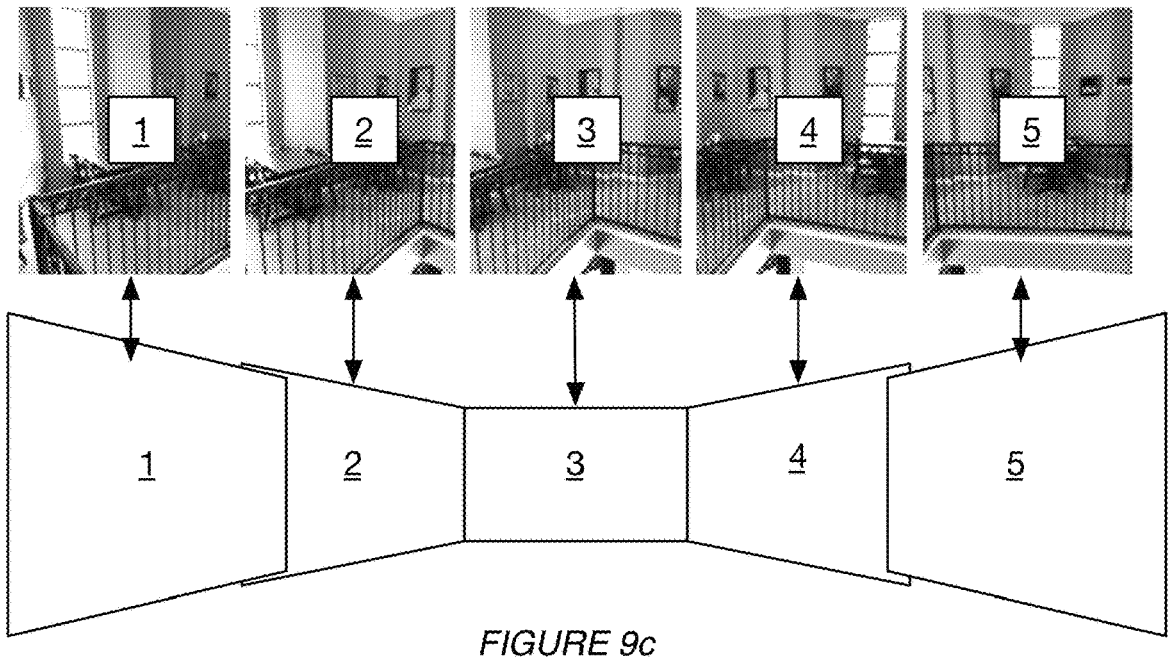
FIG. 9C is a variant of applying S200, S300, and S400 to S100.

The images can be pre-processed individually, pre-processed relative to a reference image, pre-processed as a set (e.g., in a batch), or otherwise pre-processed as shown in FIG. 9a, FIG. 9b, and FIG. 9c. In one variation, the pre-processing is performed with respect to a reference image, and all photos in the set are transformed in relation to the reference image. The reference image can be: the center image, an end image (e.g., first image, last image), an image with attributes or features closest to an ideal set of attribute or feature values, or be any other suitable image. In a second variation, the pre-processing is performed with respect to pairs of images, and all images are transformed in a pairwise relationship until all images have been transformed. In this variation, image pairs can be sequentially processed (e.g., starting from a first pair, which can include the reference image), or be processed in parallel. In a third variation the pre-processing is performed with respect to the anticipated location of the image in the panorama, such as based on heuristics learned from previous panorama generation processes. In a fourth variation, the pre-processing is performed globally between all images. In a fifth variation, the pre-processing is performed in a pairwise fashion such that the center image is transformed first, then adjacent images are transformed with respect to the center image, and then images adjacent to those images are transformed, until all images have been transformed. If there are an even number of images, the center image is the left image but can alternatively be the right image. However, the images within the set can be otherwise pre-processed.

S100 can additionally or alternatively include extracting features from the set of images. Extracting features from the set of images preferably functions to provide data used to coarsely align the images, locally align the images, but additionally or alternatively provide data that can be used to augment data collected from the device, or otherwise used.

Extracting features from the set of images is preferably performed after obtaining the images, but can additionally or alternatively be performed contemporaneously. Extracting features from the set of images is preferably performed after pre-processing the images but can additionally or alternatively be performed during or before.

The extracted features can include two-dimensional features, three-dimensional features, neural network features, or additionally or alternatively any other suitable features. The features can come from the set of images, subsets of images from the set, metadata associated with each image in the set of images, and/or from any other suitable source.

Two-dimensional features that can be extracted can include pixels, patches, descriptors, keypoints, edges, line segments, blobs, pyramid features, contours, joint lines, optical flow fields, gradients (e.g., color gradients), bit-planes, and additionally or alternatively any other suitable feature. Two-dimensional features and/or correspondences can be extracted (e.g., using feature-specific extraction methods), read (e.g., from metadata associated with the image), retrieved data from the device, or otherwise determined. Two-dimensional features and/or correspondences can be extracted using one or more: feature detectors (e.g., edge detectors, keypoint detectors, line detectors), motion estimation methods (e.g., direct methods, such as block-matching, phase correlation, frequency domain, pixel recursive methods, optical flow, etc.; indirect methods; etc.), neural networks (e.g., convolutional neural networks (CNN), deep neural networks (DNN), recurrent neural networks, generative neural networks, etc.), segmentation (e.g., semantic segmentation, region-based segmentation, edge detection segmentation, cluster-based segmentation, etc.), and any other suitable method for extracting features.

The method can optionally include determining three-dimensional features. The three dimensional features can be determined based on: 3D features from visual-inertial odometry and/or SLAM and/or photogrammetry, from multiple view triangulation of points or lines, from active depth sensors (e.g., depth data from time-of-flight sensors, structured light, lidar, range sensors, etc.), from stereo or multi-lens optics, from photogrammetry, from neural networks, and any other suitable method for extracting 3D features.

The three-dimensional features can be: captured, extracted, calculated, estimated, or otherwise determined. The three-dimensional features can be captured concurrently, asynchronously, or otherwise captured with the images. The depth data can be depth maps (e.g., sparse, dense, etc.), 3D models, signed-distance fields, point clouds, voxel maps, or any other suitable depth data. The three-dimensional features can be determined based on the individual images from the set, multiple images from the set, or any other suitable combination of images in the set. The three-dimensional features can be extracted using photogrammetry (e.g., structure from motion (SFM), multi-view stereo (MVS), etc.), three-dimensional point triangulation, or any other suitable method. Three-dimensional point triangulation can include determining image planes for an image pair using respective camera poses and projecting three-dimensional points to both image planes using camera poses and intrinsics, or any other suitable method. Three-dimensional line triangulation can include two dimensional line segments matching, line clustering based on vanishing points and projecting three-dimensional line segments to both image planes using camera poses and intrinsics, or any other suitable method.

Three-dimensional features that can be determined can include: three-dimensional camera poses (e.g., in metric scale), three-dimensional point clouds, three-dimensional line segment clouds, three-dimensional surfaces, three-dimensional feature correspondences, planar homographies, inertial data, or any other suitable feature. Three-dimensional camera poses can include 6 degrees of freedom (e.g., positon and orientation). The planar homographies can be determined by estimating the homographies based on points and/or line matches (optionally enhanced by gravity), by fitting planes to 3D data, by using camera pose and/or rotation estimates, or otherwise calculated. However, S100 can additionally or alternatively include any other suitable elements performed in any suitable manner.

5.2 Aligning Images Coarsely.

The method preferably includes aligning images coarsely S200. S200 preferably functions to roughly align the images of the set to generate a coarsely-registered image mosaic. For example, S200 performs pixel mapping from the images to the currently aligned panorama. S200 is preferably performed after S100 but can additionally or alternatively be performed contemporaneously. S200 is preferably performed before S300 but can additionally or alternatively be performed during or after.

S200 is preferably performed entirely by the computing system, more preferably the remote computing system, but can additionally or alternatively be partially or entirely performed by the device or any other suitable computing system. S200 is preferably performed entirely using the processing system, but can additionally or alternatively be performed partially or entirely using any other one or more data structures.

The data to be processed by S200 can be images and data received from S100, images and data that have been pre-processed, images and data that have associated two-dimensional and/or three-dimensional features, or other suitable data. S200 can be applied to all images within the set, to each image individually, applied to a subset of the images within the set, or to any suitable set of images.

In some variations, the data to be processed by S200 is image data close to (within a threshold distance from) a virtual-real epipole. In some implementations, the epipole is a point in the image that intersects the line (epipolar line) connecting a three-space location of a real optical center of the camera that generated the image data and a three-space location of a virtual optical center of a virtual camera for a projection plane (e.g., a panorama compositing surface) of the panorama to be generated at S400. In some implementations, the three-space location of the real optical center of the camera is identified from camera positional information estimated at S100. In some implementations, the projection plane of the panorama is determined (e.g., from the images obtained at S100), and the three-space location of the virtual optical center of the virtual camera is determined from the projection plane for the panorama.

S200 can have a reference point for the transformation. The data can be aligned relative to a reference image as shown in FIG. 9a (e.g., a common reference image, such as the center image in the panorama, etc.), an adjacent image as shown in FIG. 9b (e.g., pairwise, wherein the set of images comprises a sequence of images), the image's position in the final panorama as shown in FIG. 9c (e.g., based on the image index assigned during capture, relative camera pose during image capture, etc.), a common object or element appearing in one or more images, an ideal image, or relative to any other suitable reference. Alternatively, S200 can be performed without a reference point (e.g., applied globally across all images).

In some variations, aligning images coarsely S200 can include coarsely aligning the captured images in accordance with an order identified during image capture (e.g. by the assigned image indexes, by camera position information for each captured image, by capture time, etc.) to generate a set of coarsely aligned images. Coarsely aligning the captured images can include one or more of: identifying correspondences between images (e.g., a first one of the images obtained at S100 and a second one of the images obtained at S100) S210; computing coarse warps (e.g., based on the correspondences) S230; aligning images based on identified correspondences S240; and optionally rectifying the images (e.g., rotational rectification, translational rectification, etc.; before computing coarse warps) S220. Coarsely aligning the captured images can optionally include performing wave correction S250. However, coarsely aligning images can be otherwise performed.

Coarsely aligning the captured images can include coarsely aligning a first image with a second image.

The first image can be an image (obtained at S100, or a version thereof) that has not yet been coarsely warped or coarsely aligned (at S200). Alternatively, the first image can be an image that has been coarsely warped or coarsely aligned with another image (e.g., a third image). The first image can be a captured image in its original image plane, or alternately a warped version of a captured image in another image plane (e.g., an image plane of the final panorama, an image plane of the center image, an image plane of an adjacent image, etc.). However, the second image can be any suitable image included in the set of images obtained at S100 or transformed at S200.

Similarly, the second image can be an image (obtained at S100, or a version thereof) that has not yet been coarsely warped or coarsely aligned (at S200). Alternatively, the second image can be an image that has been coarsely warped or coarsely aligned with another image (e.g., a fourth image). The second image can be a captured image in its original image plane, or alternately a warped version of a captured image in another image plane (e.g., an image plane of the final panorama, an image plane of the center image, an image plane of an adjacent image, etc.). However, the second image can be any suitable image included in the set of images obtained at S100 or transformed at S200.

For example, the first image can be coarsely aligned with the center image, a reference image, or an image that is between the first image and the center image. In variants, coarse alignment can be performed in stages. The first image can be aligned with the second image in a first stage, and then aligned first and second images can be coarsely aligned with a third image. However, images can otherwise be coarsely aligned.

Identifying correspondences between images S210 functions to aid the coarse alignment (and subsequent fine alignment). Identifying correspondences between images S210 can include identifying correspondences (e.g., features, pixels, groups of pixels) between the first image and the second image.

Identifying correspondences between images S210 can include one or more of: matching features S211, determining at least one optical flow S212, tracking motion S213, estimating at least one depth map S214, and estimating at least one light field S215. In some variations, results generated by performing one or more of S211-S215 are used to compute a coarse warp S230 (e.g., a parametric warp, a pixel warp, etc.).

Matching features S211 can include matching at least a first feature in the first image with a corresponding feature in the second image S211.

In some implementations, the first and second features are line segments. In some implementations, the first and second features are points. In some implementations, the first and second features are keypoints.

In some implementations, if camera poses can be estimated, feature matches can consider 3D epipolar consistency constraints. Because a 2D point of unknown scene depth can only appear as a point in the vicinity of the epipolar line in the other image, spurious correspondences can be eliminated.

In a first example, a feature detector detects the first and second features, and generates corresponding feature descriptors, and determines a match between the first feature and the second feature includes comparing feature descriptors of the features.

In a second example, determining a match between the first and second features includes mapping a region of one or more pixels in the first image to a corresponding region of one or more pixels in the second image by using a pixel motion model. The pixel motion can be generated based on one or more of a comparison of the first and second images, and video tracking.

In a third example, determining a match between the first and second features includes accessing a photometric descriptor signature for each feature and comparing the photometric descriptor signatures.

In a fourth example, determining a match between the first and second features includes accessing a semantic segmentation context for each feature and comparing the semantic segmentation context of the features. Semantic segmentation context can be generated by performing semantic segmentation on the first and second images. Performing semantic segmentation for an image can include segmenting the image into multiple regions, and assigning a semantic label to each region, and optionally a semantic label to one or more features of the region. For example, semantic segmentation performed on an image of a room can segment the image into a region assigned a "door" semantic label and a region assigned a "table" semantic label. Each line feature of the "door" region can be identified and labeled (e.g., "top edge of door", "bottom edge of door", "left edge of door, "right edge of door", etc.). Each line feature of the "table" region can be identified and labeled in a similar manner. In this manner, line features in the two images match if their semantic segmentation contexts also match. For example, lines that each have a "left edge of first door" label match, whereas a line having a "left edge of door" label and a line having a "right edge of door" label do not match.

In a fifth example, determining a match between the first and second features includes capturing a video that includes image frames corresponding to the first and second images, and performing video-based tracking to track movement of the first feature in the first image to a location in the second image.

In a sixth example, determining a match between the first and second features includes projecting the first feature onto the image plane of the second image, and comparing the 2D shape of the projected first feature with the 2D shape of the second feature.

In a seventh example, determining a match between the first and second features includes projecting the first feature onto the image plane of the second image, and comparing the 3D geometry of the projected first feature with the 3D geometry of the second feature. 3D geometry of features can be represented by point clouds.

Data for features in each image can be extracted at any suitable time (e.g., at S150, at S211, etc.). Correspondences between images can be sparse mappings between a small set of matching features, or dense mappings between a larger set of matching features.

Features can include two-dimensional (2D) features, three-dimensional (3D) features, or any other suitable type of features. In some variations, for each image, feature data for a feature included in the image includes a set of one or more coordinates for the feature (e.g., in a coordinate space of the image, in a real world coordinate space, etc.) and optionally a feature descriptor. Example features include pixels, edges, patches, segments, keypoints, blobs, edges, contours, lines segments, objects, learned features, and voxels. However, any suitable features can be used.

The features can be extracted during image set preparation S150. In variants, S150 can include: pre-processing the images, and extracting features.

Any suitable feature detection process can be performed to detect features in images. In some variations, at least one feature detector (e.g., included in at least one component of the system that performs the method) detects features in images. In some implementations, detecting a feature in an image includes identifying coordinates of a feature (in a coordinate space of the image), and generating a feature descriptor for the feature. In some variations, a line segment detector is used to detect line segments. In some implementations, the line segment detector performs image processing to detect line segments. Example line segment detectors include Line Segment Detector (LSD), wireframe detector neural networks, attraction field methods, Markov Chain methods, and the like.

The 2D features can be extracted using 2D feature detection methods (e.g., keypoint detection, edge detection, segment detection, edge detection, line detection, etc.), or otherwise determined. The 3D features can be extracted (e.g., calculated) during image capture, obtained from AR systems (e.g., executing on the capture device), calculated using photogrammetry (e.g., using the set of images), or otherwise determined. However, any suitable set of features can be identified and mapped between one or more images of the set.

Determining at least one optical flow S212 can include, for each pixel in the first image, predicting which pixel in the second image would match the pixel in the first image.

Tracking motion S213 can include capturing video that includes the first image (e.g., an image that includes a centered first image centering target 802), the second image (e.g., an image that includes a centered second image centering target 803), and a plurality of intermediate video frames between the first image and the second image. Video tracking is performed to track movement of at least one feature between each pair of adjacent video frames. By tracking motion of a feature across intermediate video frames, a location of the feature in the second image can be identified.

Figure 13:
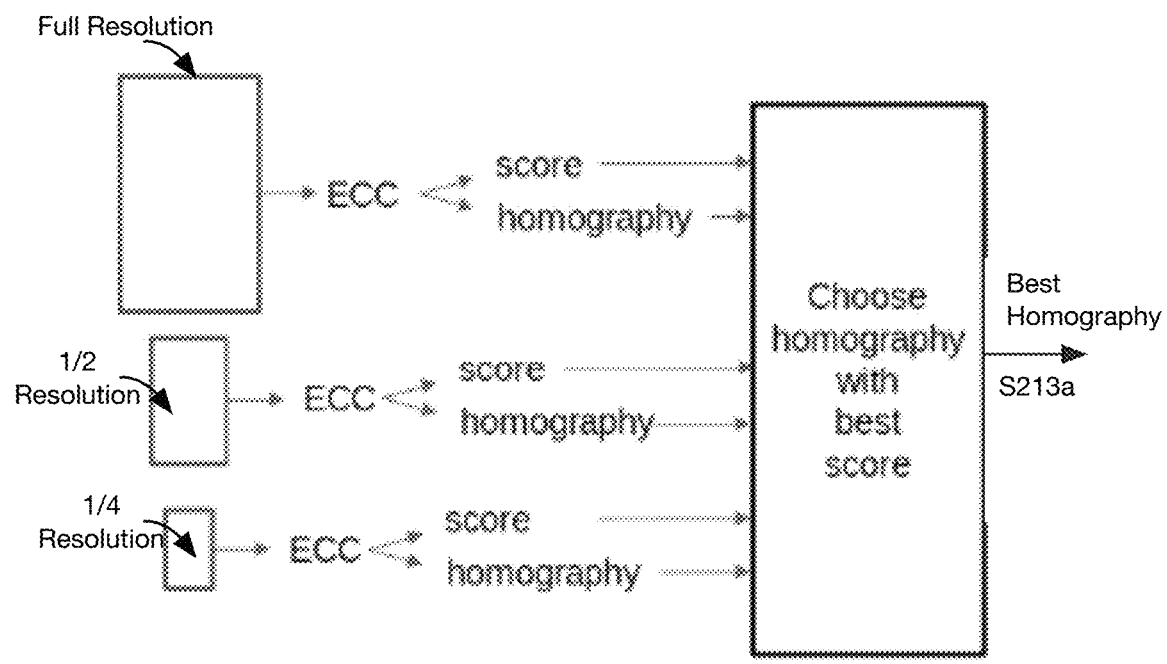
FIGS. 13-15 are representations of tracking motion of features.
Figure 14:
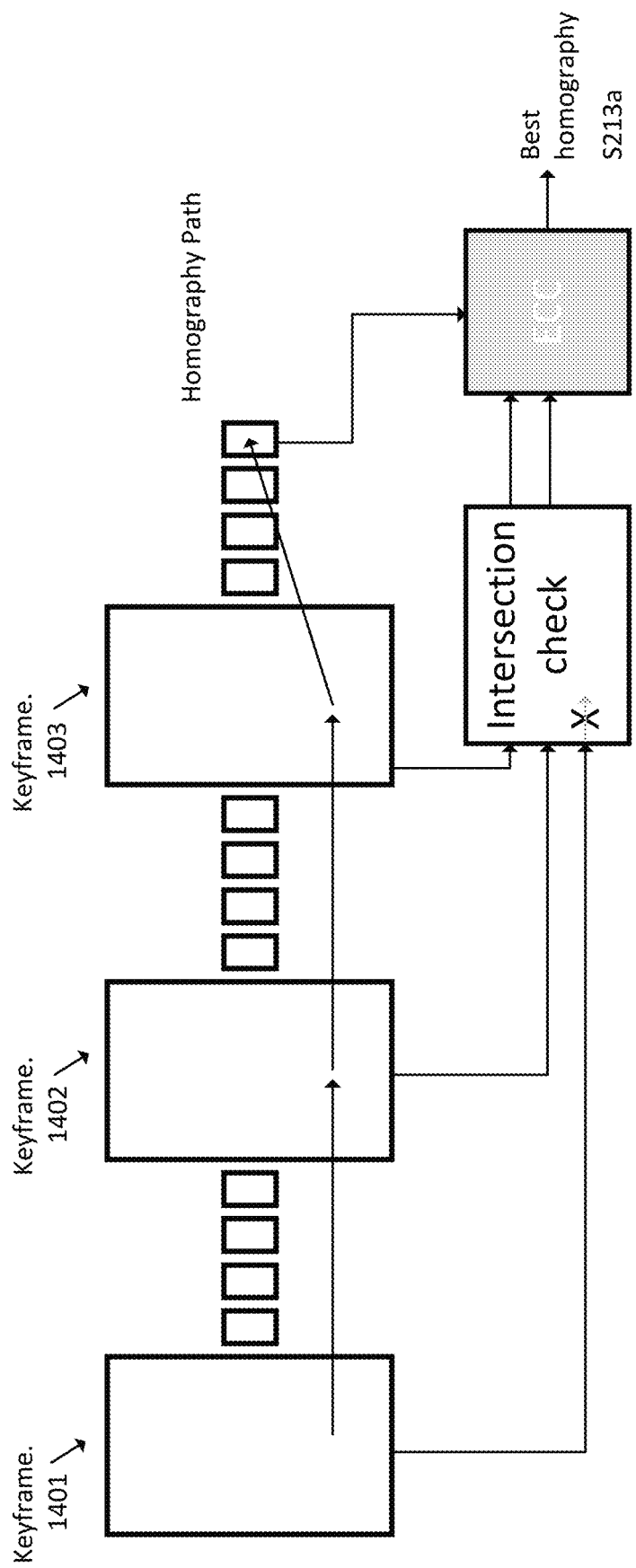
Figure 15:
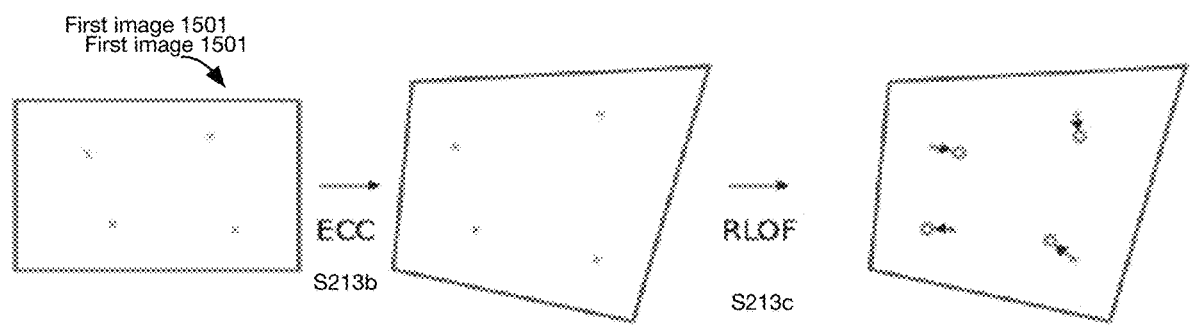

In some variations, tracking motion of a feature included in the first image to a location in the second image includes accessing a first intermediate video frame (e.g., keyframe 1401 shown in FIG. 14) adjacent to the first image (e.g., 1501 shown in FIG. 15), and estimating a first transformation from the first image to the first intermediate image (e.g., S213a shown in FIGS. 13 and 14). This process is applied for each subsequent intermediate video frame (e.g., keyframe 1402, 1403), wherein a new transformation is estimated from the previous intermediate video frame (e.g., 1402) to the subsequent intermediate video frame (e.g., 1403). Each transformation to an intermediate video frame is stored. In some implementations, feature points for the tracked feature are also stored in association with each transformation. Transformations estimated for intermediate video frames between the first image and the second image are applied to the first image to identify a location of the feature in the last intermediate video frame before the second image (e.g., S213b, shown in FIG. 15). Thereafter, an optical flow is estimated between the last intermediate video frame and the second image, and the optical flow is used to identify the location of the feature in the second frame from the location of the feature in the last intermediate video frame (e.g., S213c, shown in FIG. 15). In some implementations, a RLOF (Robust Local Optical Flow) process is performed to estimate the optical flow.

In some implementations, the transformation is a homography. In some implementations, the transformation is estimated by performing Enhanced Correlation Coefficient homography estimation. In some implementations, for each transformation from a source image to an intermediate video frame, several versions of the source image are generated at different resolutions (e.g., as shown in FIG. 13), and a transformation to the intermediate video frame is generated for each of the several resolutions of the source image. Each such transformation is scored, and the transformation with the best score is selected.

Estimating at least one depth map S214, can include detecting objects in the first image, estimating a depth for each object in the first image, detecting objects in the second image, estimating a depth for each object in the second image, and identifying an object in the second image that matches estimated depth of an object (and optionally other attributes of the object) in the first image. In variants, estimating depth maps S214 operates on the principle that objects in different images (captured in connection with generation of a panorama image, e.g., during guided capture) that have the same (or similar) estimated depth values are likely the same object. For example, if the first and second images are generated by rotating a camera about an axis, the depth estimated for a same object in the first and second images are likely to be the same (or have a difference below a threshold amount).

Estimating at least one light field S215 can include using multiple images and optional camera pose estimates to estimate approximate light fields or radiance fields for the scene, which can be used to render panoramas from novel viewpoints and virtual camera parameters and/or estimating depthmaps.

In one variation of correspondence identification in S200, if a camera's intrinsics matrix and gravity vector estimate is available for an image (e.g. from inertial sensors in camera, from vanishing point estimation, from neural networks, etc.), then the vertical vanishing point can be computed. The vertical vanishing point is the direction that all 3D vertical lines in the scene should be pointing in their 2D image projections. Then, for every point in an image, a vertical reference orientation, pointing from an image point to the vanishing point, can be computed for all images. This can aid in feature matches, by only matching features that also have matching vertical orientation in each image, but can aid in any other suitable manner.

In a second variation of correspondence identification in S200, if a gravity vector estimate is available for an image (e.g. from inertial sensors in camera, from vanishing point estimation, from neural networks, etc.) it can be used to add artificial, 3D plausible line segments in the images by constructing a gravity-oriented 3D projected line through an image point and the calculated vanishing point. Generating such vertical lines uniquely across images can also be used to generate virtual line segments matches from point matches (e.g. gravity-oriented lines), but can be used in any other suitable manner. However, correspondences (e.g., between features, objects, pixels, etc.) can be identified in any other suitable manner.

Figure 6:
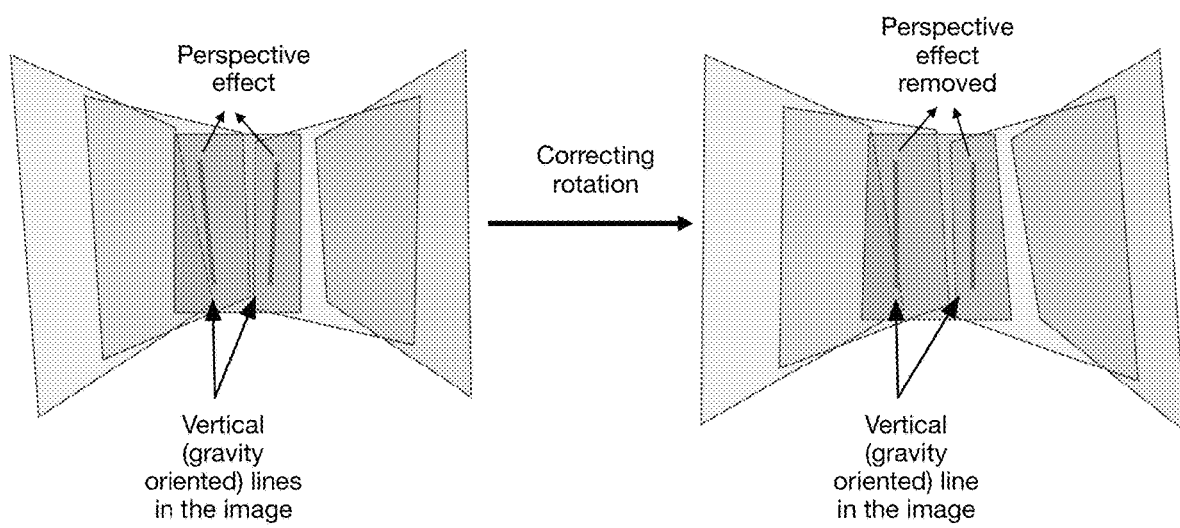
FIG. 6 is an example of S200 correcting rotation using gravity vectors and constraining the gravity vectors to be parallel in 2D.

Rectifying images S220 can include rotational rectification, as shown in FIG. 6, which functions to correct camera orientation (e.g. pitch, yaw, roll, etc.) for a given image to improve appearance or reduce perspective effect. Rotational rectification is preferably performed before coarse alignment (e.g., before coarse warp computation), but can additionally or alternatively be performed during or after. Rotational rectification is preferably applied to each image of the set, but can additionally or alternatively be applied to a subset of the images (e.g., all images except the reference image), a single image, or to any other suitable set of images.

Rotational rectification can be achieved by rotation-based homography warp of the image (e.g., raw image, globally aligned image, locally aligned image, final panorama, etc.) relative to a set of target rotations or target coordinate axes, or any other suitable method. The target rotations can be computed using extrinsic camera pose estimates, gravity vectors, vanishing point calculations, device sensors, or any other suitable method.

Gravity vectors can be estimated by multiple methods. In a first variation, the gravity vector is calculated from the phone orientation or camera orientation, during image capture (e.g., from phone IMU). In a second variation, the gravity vector is inferred from the images. In one example, the gravity vector can be inferred from vanishing point clustering methods applied to line segment features, present in the images. In a third variation, gravity directions can be estimated by trained machine learning methods. In a fourth variation, gravity directions are received from a user. However, the gravity directions can be otherwise determined. However, the images can be otherwise rectified.

S200 can optionally include applying one or multiple pixel motion models to complete images or to partial images, which can function to coarsely (e.g., approximately) align an image with other images in the set of images and/or to the currently aligned panorama being created. The outputs of the pixel motion models can be used to: find feature correspondences (e.g., at S210) (e.g., wherein features are matched using the bulk-associated pixels); compute coarse warps (e.g., at S230) (e.g., to find the coarse alignments); or otherwise used. The pixel motion models preferably ingest an image of interest and a reference image (e.g., both of which can be from the image set), or can use any other suitable set of inputs (e.g., camera motion parameters, etc.). The pixel motion models preferably output global or semi-global mappings that bulk associate pixels in the image to the target (e.g., the reference image), but can additionally or alternatively output motion parameters (e.g., parametric motion parameters), or output any other suitable set of parameters. For example, S200 may use one or multiple pixel motion models including: homography warps, rotation-derived homography warps, multiple local homography warps, optical flow fields, depth-layered warps, novel-view synthesis, or any other suitable coarse-alignment technique. However, the pixel motion models can include local mappings, pixel-to-pixel associations, or any other suitable model.

Pixel motion models can be applied to the center image, with respect to all images in reference to the center image, or with respect to any other suitable set of images. Pixel motion models are preferably applied to the center image to align it with the other images in the set, but can additionally or alternatively be applied with reference to any other suitable image in the set, any other suitable subset of images in the set, and/or all of the other images in the set including the center image, or any other suitable image. For example, the center image's plane as shown in FIG. 3 can be isolated, and the other images can be projected onto the center image's plane and content-preserving warping can be used on the center image to minimize perspective distortion in the resulting panorama.

Computing coarse warps S230 functions to find a simple, bulk assignment of pixels between the images within the set (e.g., between pairs of images) that removes much of the initial misalignment in the images caused by factors such as camera rotation, camera positional differences for nearly planar surfaces, differences of projection for dominant features, and/or other factors. The coarse warps are preferably performed on the rectified images, but can be additionally or alternatively performed during or before image rectification.

Computing coarse warps S230 can be applied to one or more images. In one variation, coarse warps are computed incrementally, pairwise (e.g. sequential images, adjacent images, etc.). In a second variation, coarse warps are computed relative to a reference image. In a third variation, coarse warps are computed according to the image's panorama position (e.g., based on image index, camera pose associated with the image, etc.) and predetermined alignment rules (e.g., rules based on two-dimensional features, rules based on three-dimensional features, etc.) for that position. In a fourth variation, coarse warps are computed globally across all or a subset of the images. However, the coarse warps can be computed for any suitable set of images.

Computing a coarse warp S230 can include projecting each non-center image in the set of captured images onto an image plane of the panorama (composited at S400). In some implementations, the image plane of the panorama is the image plane of the center image (e.g., as identified by the image indexes).

Computing coarse warps S230 can use one or more features (e.g., two-dimensional, three-dimensional, etc.), correspondences (e.g., determined at S210), homographies (e.g., rotational homographies, plane induced homographies, 3DOF, 4DOF, 6DOF, 8DOF, etc.), camera poses (e.g., from visual-inertial SLAM pose estimation, SFM pose estimation), external objects (e.g., semantics, global position), external object poses (e.g., pose and/or orientation such as from sparse or semi-dense optical flow estimation), layered depth images, but additionally or alternatively use any other suitable data.

Computing coarse warps S230 can be achieved using one or more methods (e.g., an ensemble of methods). The methods can include: 2D & 3D feature-based matching methods (e.g., sparse or dense optical flow, direct methods, feature matching), parametric methods (e.g. fitting one or more perspective or affine warping models to correspondences using RANSAC, calculating warps from estimated camera poses, etc.), hierarchical motion estimation, photometric alignment, Fourier or phase-based alignment, or any other suitable method.

In a first variation, coarse warps can be computed (at S230) using parametric modeling of global (e.g., whole image) or semi-global (e.g., portions of an image) geometric warps (e.g., estimate one or more parametric motion parameters that describe bulk mapping of pixels from one image to another) (e.g., at S231). Parametric modeling can be performed using 2D or 3D features (e.g. using direct linear transform, robust regression, random sample consensus, uncertainty weighting or other techniques). Parametric modeling can additionally or alternatively use estimated attributes of the camera or scene motion model to estimate pixel motion under camera position change (e.g. using camera 3DOF or 6DOF relative poses to compute homographies). Parametric modeling can support multiple, hybrid or approximate geometric models (e.g. projective/perspective warps, affine warps, similarity warps, as-projective-as-possible warps, etc.).

In some implementations, computing a coarse warp S230 includes determining one or more transformations by using the first image and the second image, and applying one or more determined transformations to the first image. In some variations, a single transformation can be used to compute a warped pixel coordinate for each pixel coordinate included in the first image (or in a region of the first image). In an example, a transformation is represented as a matrix. However, transformations can have any suitable format and/or representation. Transformations can include any suitable type of parametric transformation, and can be computed in any suitable manner. In some implementations, features (or pixels or groups of pixels) in the first image that correspond with features (or pixels or groups of pixels) in the second image (e.g., as identified at S210) are used to determine one or more transformations used to compute the coarse warp.

In a first implementation, a transformation is computed that transforms 2D image coordinates of the feature (or pixel or groups of pixels) in the first image to the 2D image coordinates of the corresponding feature (or pixel or groups of pixels) in the second image. In a second implementation, a transformation is computed that transforms 3D coordinates of the feature (or pixel or groups of pixels) in the first image to the 3D coordinates of the corresponding feature (or pixel or groups of pixels) in the second image. The determined transformations are used to warp the first image into a warped image that can be aligned with the second image (at S240) such that corresponding features (or pixels or groups of pixels) overlap.

In variants, computing a transformation includes selecting one or more correspondences identified at S210 to be used to compute the transformation. In an example, all correspondences are selected. Alternatively, a subset (e.g., a subset, strict subset) of correspondences is selected. In implementations, a plurality of subsets of correspondences is selected, and a transformation is computed for each subset of correspondences. One or more of the computed transformations can be applied to the first image.

Transformations computed for the first image can be evaluated and selected for use in warping the first image. In some implementations, evaluated transformations are re-computed (e.g., by removing correspondences from the subset used to compute the original version of the transformation) to improve the transformation's evaluation. In an example, a transformation is evaluated by warping the first image using the transformation and evaluating the warped image (based on one or more evaluation metrics).

In variants, transformations are computed for several regions (e.g., layers) of the first image (e.g., foreground, background). A transformation for a region is computed by using one or more correspondences included in the region. A transformation for a region can be evaluated and selected for use, or re-computed using a different (e.g., smaller) set of correspondences. In some implementations, the transformations computed for each region are applied successively to the first image to generate a final warped image.

In a second variation, coarse warps are obtained (at S230) directly using dense or sparse feature-based optical flow methods (e.g., at S232). Sparse flow warps can be densified (filling holes) using local optimization techniques, local triangulation techniques (e.g., delaunay triangulation), neural networks, or any other suitable method. In some implementations, performing a coarse warp using an optical flow method includes, for each pixel in the first image, predicting a location of the pixel in the warped image. The warped image can then be aligned with the second image such that corresponding features (or pixels or groups of pixels) identified at S210 overlap.

In some variations, a depth map of the scene of the first image is obtained, and used to perform novel view synthesis to generate a warped version of the first image. In some implementations, objects in the first image are detected. For at least one detected object in the first image, a corresponding object in the second image is identified (e.g., from correspondences identified at S210), and a point cloud (that includes 3D coordinates of pixels of the object) for the object is identified for each of the first and second images (e.g., by using the depth map). The point clouds are used to compute a transformation that transforms 2D coordinates of the pixels of the object in the first image to the new 2D coordinates in the warped image. Additional pixel values for the warped image can be interpolated. The warped image can be aligned with the second image (at S240) such that corresponding object in the warped image overlaps with the object in the second image.

In some variations, a lightfield of the scene of the first image is obtained and used to perform novel view synthesis to generate imagery for a panoramic image.

In some implementations, a neural network is used to generate a light field estimate (e.g., by using the images captured at S100 and corresponding camera poses). In some implementations, the light field is represented as a plenoptic function that estimates color wavelength and intensity luminance ($\lfloor$,E) for a specified 3D location (in space) (x, y, z) and a specified 3D angular altitude-azimuth ray direction ($\rceil$, $\backslash$). The plenoptic function can be used to compute a coarsely aligned panoramic image. For example, for each pixel in the coarsely aligned panoramic image, the plenoptic function computes a color wavelength value and an intensity luminance value for the pixel.

In a third variation, coarse warps are computed using depth images (e.g. depth maps, point clouds, voxel clouds, signed distance maps, etc.), wherein layered depth images can be aligned using the one or more of the aforementioned warping methods, applied to different layers (e.g., sharing a range of depths) independently.

In a fourth variation, gravity estimates are used to restrict homography computation under conditions when rotation is the dominant camera motion. Normal rotational homographies can be derived from the relative rotation between the two images, which can have three degrees of freedom. The gravity direction of two images can be used to restrict the degrees of freedom to one degree of freedom (e.g., the rotation around an axis pointed in the gravity direction). Computing the homography with only one degree of freedom can be done analytically with only one feature match, but can additionally or alternatively be computed using a robust regression, using a least squares approach with more matches (which can be beneficial for robustness), or can be otherwise found. This can have the benefit of requiring less feature matches, since a general homography has 8 degrees of freedom, and enforces a geometric constraint by forcing the images to have a consistent gravity direction after alignment, but can be beneficial for any other suitable reason.

In a fifth variation, the homography is computed using the above method, and then bundle adjustment can be applied to improve or optimize the resulting warp. This variation can have the benefit of being more robust to motions other than pure rotation.

Aligning images based on the identified correspondences S240 can include, for each warped image, coarsely aligning the warped image with a corresponding reference image in the image plane of the panorama (e.g., the image plane of the center image). Aligning the warped image with a corresponding reference image (e.g., the second image) can include aligning features (or pixels or groups of pixels) in the warped image with the corresponding features (or pixels or groups of pixels) in the second image (reference image) (as identified at S210). Aligning features can include aligning features (or pixels or groups of pixels) such that features (or pixels or groups of pixels) included the warped image overlap with the corresponding features (or pixels or groups of pixels) in the second image. In some implementations, there may be some alignment errors after coarse alignment, and at S300 fine alignment is performed to reduce the alignment errors that are present after coarse alignment.

Figure 7:
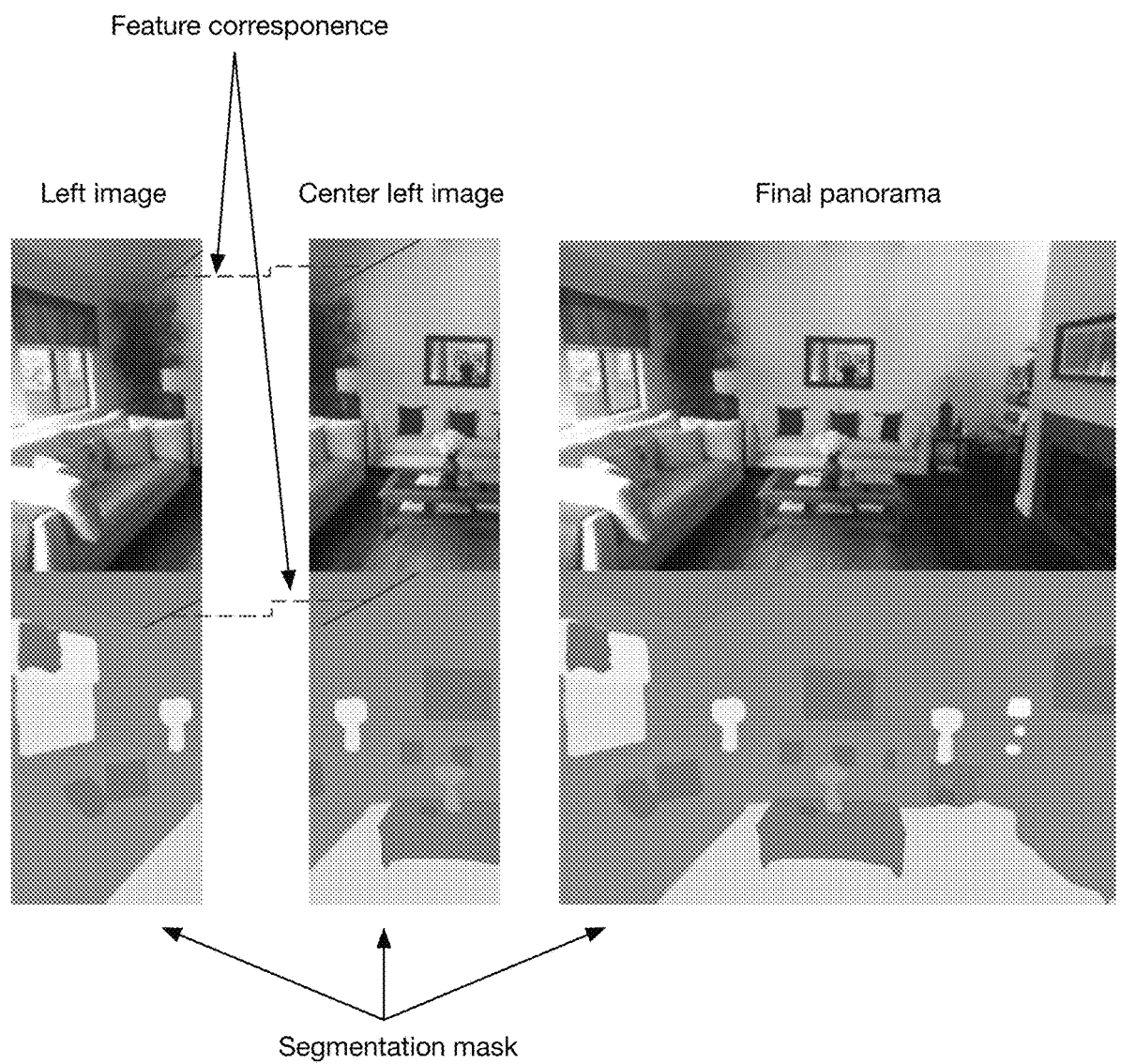
FIG. 7 is an example of using wall seams and semantic segmentation as context to disambiguate feature matches as used in S200.

In one variation of S200, coarsely aligning images is achieved by the initial computation of 2D correspondences (e.g., by matching features at S211) between multiple images for use in warp computation. In one example, keypoint based extraction and matching techniques are used to find correspondences (e.g., at S211). In a second example, optical flow is used to find correspondences (e.g., at S212). In a third example, estimated 2D correspondences from the device or AR or photogrammetry system are used. In a fourth example, 3D correspondences (e.g., between points, lines, etc.) and estimated camera poses are used to project into 2D images to obtain correspondences. In a fifth example, line segments are matched between images and used as correspondences. In a sixth example, semantic segmentation can be used to find correct feature correspondences as shown in FIG. 7, where matching features must also share containing or surrounding classes. In a seventh example, gravity is used as a discriminator to improve feature correspondences, where line segments must have the same gravity orientation to be valid matches. In an eighth example, joint line detection and matching can be achieved using deep learning. In a ninth example, sparse correspondences can be densified (filling holes) using optimization, filtering, machine learning, or ensemble techniques.

In a second variation of S200, coarsely aligning images is achieved using one or more plane-induced homographies computed from feature matches (e.g. pixel, patch, keypoint, line segment, etc. matches) between image pairs (e.g. matches calculated from the device, from feature matching, or from photogrammetry/structure from motion) using robust regression and Random Sample Consensus (RANSAC)—and using these homographies to map image pixels to a panorama being composited. In a preferred example, this process occurs iteratively (pairwise) based on a reference image (e.g., center image, image of an image pair proximal the center image, previously-aligned image, etc.).

In a third variation, coarsely aligning images is achieved using two-dimensional feature alignment. For example, two dimensional features (e.g., points, lines, contours, tracking information, and any other suitable 2D feature) from one image can be compared to two-dimensional features of a second image (e.g., detected in the second image, projected from the second image). The similar features can be used to align the images in a pairwise fashion. In a second example, two-dimensional features of a reference image (e.g., center image) can be matched to two-dimensional features of non-reference images. The adjacent images can be examined preferably individually or in parallel to determine similar features. In a third example, two-dimensional features of an image can be compared with respect to the image's placement in the final panorama. The image can be aligned following a set of predetermined heuristics. In a fourth example, bitplanes can be used for matching regions with subtle or dark texture patterns. In a fifth example, optical flow of points or lines can be used to align images.

In a fourth variation, coarsely aligning images is achieved using three-dimensional feature alignment. In a first example, 3D features can be projected into all other images (even outside the bounds of the images) to establish correspondences between a reference image and the one or more non-reference images. In a second example, the three-dimensional data is used to align the image to a final panorama position, based on heuristics that define parameters for the visual appearance of the image in the final panorama.

In a fifth variation, coarsely aligning images is achieved using a combination of two-dimensional and three-dimensional feature alignment. The combination of two-dimensional feature alignment functions to match overlapping regions and three-dimensional feature alignment functions to align non-overlapping regions. In a first example, three-dimensional feature alignment is accomplished using three-dimensional feature projection.

In a sixth variation, aligning images globally is achieved using camera pose estimation from SLAM, IMU, photogrammetry, vanishing points, and/or neural networks, but additionally or alternatively is otherwise aligned. In one example, a coarse warp for coarse alignment can be calculated from device rotations. However, S200 can additionally or alternatively include any other suitable elements performed in any suitable manner.

5.3 Aligning Images Finely.

Figure 5A:
FIG. 5A is an example of meshing and mesh deformations for purposes of fine, local alignment from S300.
Figure 5B:
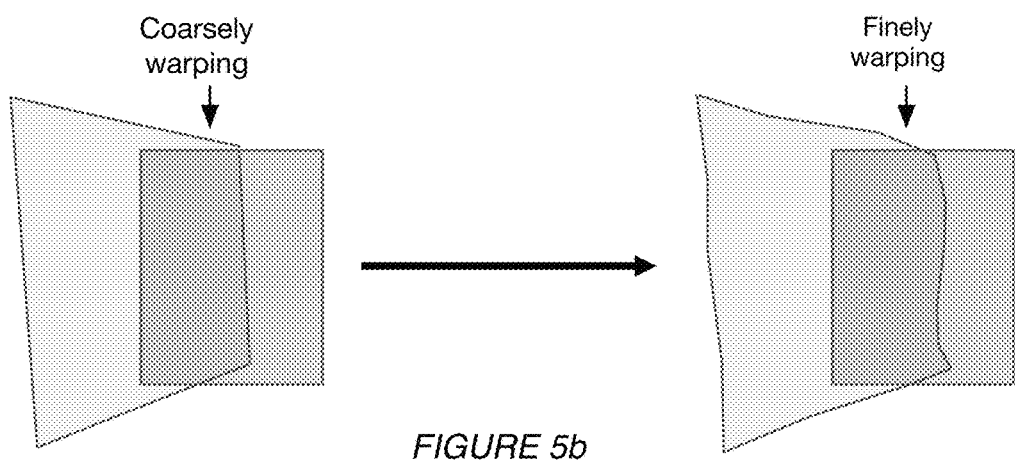
FIG. 5B is an example of coarse warping from S200 and fine warping from S300.

The method preferably includes aligning images finely S300. In variants, S300 functions to attempt to locally correct remaining image misalignments after coarse alignment is complete (e.g. locally moving, floating, or stretching local areas of the image to better align with other images), as shown in FIG. 5a and FIG. 5b (e.g., using constrained local warping, content-preserving warps, global shape anchors, etc.). S300 is preferably performed after S200, but can additionally or alternatively be performed contemporaneously or at any suitable time.

Aligning images finely S300 can include finely aligning images in the set of coarsely aligned images to generate a set of finely aligned images. Aligning images can include finely aligning pairs of images in the set of coarsely aligned images (e.g., pairs of adjacent images, etc.) (e.g., generated at S200). S300 can include for at least one image in the set of coarsely aligned images, accessing constraints S310, dividing the image into a uniform grid mesh S320, and adjusting grid mesh vertices to maximize a combination of constraint values S330. In variants, the image is modified using the adjusted grid mesh vertices (S340). Constraint values can include at least a feature constraint value and a global shape anchor constraint value. In some variations, adjusting vertices includes generating one or more sets of adjusted vertices. In some variations, for each set of adjusted vertices, each constraint value is calculated. A combined constraint value is combined by combining the calculated constraint values. Constraint values can be combined in any suitable manner. In some implementations, constraint values are weighted (according to respective weight values) and the combined constraint value is calculated by computing a sum of the weighted constraint values. However, a combined constraint value for a set of adjusted vertices can otherwise be determined. In some implementations, a set of adjusted vertices having a highest combined constraint value is selected.

S300 can include multi-layer mesh warping. Multi-layer mesh warping can include segmenting at least one image in the set of coarsely aligned images into several layers, with each layer including features having a similar depth. For example, an image can be segmented into a three layers, e.g., a near, middle, and far layer using superpixels and depth of points within each superpixel. In some variations, one or more constraints are assigned to each layer. In some implementations, feature constraints are assigned to layers based on the spatial position of the related feature. For example, for a line feature that is included in a "near" layer, the line's feature constraint is assigned to the near layer. Grid mesh vertex adjustment is performed independently for each layer individually. For each layer, vertex adjustments are generated, and a combination of constraint values (for the constraints assigned to the layer) is calculated for each vertex adjustment. A vertex adjustment that has the highest combination of constraint values is selected for the layer. For each layer, a copy of the image is warped by using the selected vertex adjustment for the respective mesh. The warped images generated (one being generated for each layer) are then blended to produce a final finely warped image.

S300 is preferably performed entirely by the computing system, more preferably the remote computing system, but can additionally or alternatively be partially or entirely performed by the device or any other suitable computing system. S300 is preferably performed entirely using the processing system, but can additionally or alternatively be performed partially or entirely using any other one or more data structures.

The data received by S300 to be processed is preferably the set of images, any 2D & 3D feature correspondences, and computed coarse warps (e.g. set of coarsely aligned images obtained at S200), but can be any other suitable data. S300 can be applied to images pairwise, in a batch, or otherwise applied. Pairwise local alignment can include aligning each sequential pair of images within the set, can include aligning images with respect to a reference image (e.g., center image), or include aligning any other suitable pair of images. S300 can be applied to images in a predetermined order, globally across all images in parallel, starting from the center image and working outwards to adjacent images, from left to right, randomly, or in any other suitable order.

S300 can use two-dimensional methods, three-dimensional methods, a combination of two and three-dimensional methods, or any other suitable method. In a first example, local alignment is achieved using one or more: energy-optimized mesh warping (e.g., using an energy optimization method that optimizes for one or more constraints), content-preserving warps (e.g., preserving the integrity of important global features, such as keeping straight lines straight, reducing vanishing point changes, reducing visible perspective distortions, reducing local size or shape changes, etc.), constraint-based local warps (e.g., constraining two-dimensional points between two images to be in the same location in the final panorama, constraining two-dimensional line matches between two images to be collinear in the final panorama, constraining three-dimensional points to project close to the composited feature location, constraining three-dimensional line segments to project close to the composited feature location in locations and/or angle, etc.), adaptive as-natural-as-possible image stitching, as-projective-as-possible image stitching, but additionally or alternatively include any other suitable process for aligning images locally.

S300 can include initializing meshes from coarse warps (S320) (partitioning an image, such as a coarse-warped image, into cells and mapping these cells to another reference image). This meshing can function to divide the image into local regions in one image that are mapped into a reference image, so the local regions can be locally processed or deformed or otherwise optimized to improve alignment. The mesh is preferably a grid of cells (e.g., 40×30, 16×20, 400×300, etc.), but can be an array, list, graph, tree, or any other suitable data structure. The cells are preferably square, but can additionally or alternatively be rectangular, triangular, hexagonal, or have any other suitable geometry (e.g. superpixel segmentation). S300 can be hierarchical (e.g. more detail in some areas, less in areas of uniform appearance, etc.). In a preferred example, the vertices of the mesh cells are mapped to the final panorama coordinates.

S300 preferably includes locally deforming the mesh (S330). Locally deforming the mesh functions to locally align a first image (or features thereof) with a second image (or features thereof) without moving distant pixels, enabling better local alignments. Locally deforming the mesh preferably includes adjusting the vertices of the mesh to locally distort one image and its mapping into other images, but can otherwise locally deform the mesh. Locally deforming the mesh can balance multiple (sometimes contradictory) constraints, such as the objectives of aligning some features while not excessively deforming other features and/or other criteria. The deformation can be applied to the vertices and/or cells of the mesh: individually, in clusters, sequentially, in parallel, iteratively, or in any suitable grouping or order.

Locally deforming the mesh (S330) can include using an optimizer. The optimizer preferably functions to optimize for feature alignment (e.g., two-dimensional, three-dimensional, etc.) between images and one or more constraints. The constraints can have equal or differing weights in the optimization. However, the mesh can be locally deformed using a rule set, using a heuristic set, using a matching model, manually deformed, or otherwise locally deformed.

In a first example, the optimizer can be an energy-based optimizer, wherein the optimizer can include an energy score that incurs penalties that increase based on how severely certain constraints remain unmet. In this manner, an energy-based optimization can deform a mesh in a way that yields a locally-optimal balance of the competing constraints. However, any other suitable optimizer can be used.

The constraints (e.g., accessed at S310) can include objectives of correspondence preservation (e.g., features across images map to the same location in the composite image, etc.), integrity preservation (e.g. straight lines stay straight after deformation), geometry preservation (e.g. known 3D points lie at the proper location in the pano, vanishing points stay consistent, deformed mesh doesn't deviate excessively from the initial coarse warp, local cells don't change in scale or shape excessively, vertical lines don't deviate excessively from gravity, etc.), photometric preservation (e.g. pixel intensities & colors match well between cells, etc.), or any other suitable constraints.

Correspondence preservation constraints can include constraints related to two-dimensional features and/or constraints related to three-dimensional features.

In some variations, correspondence preservation constraints include one or more of: 2D point alignment constraints, 3D point alignment constraints, cell shape constraints, line straightness constraints, 2D line alignment constraints, 3D line alignment constraints, vanishing point constraints, loop closure constraints (e.g., for 360 degree panoramic images). However, any other suitable type of 2D or 3D constraint can be used.

Figure 16:
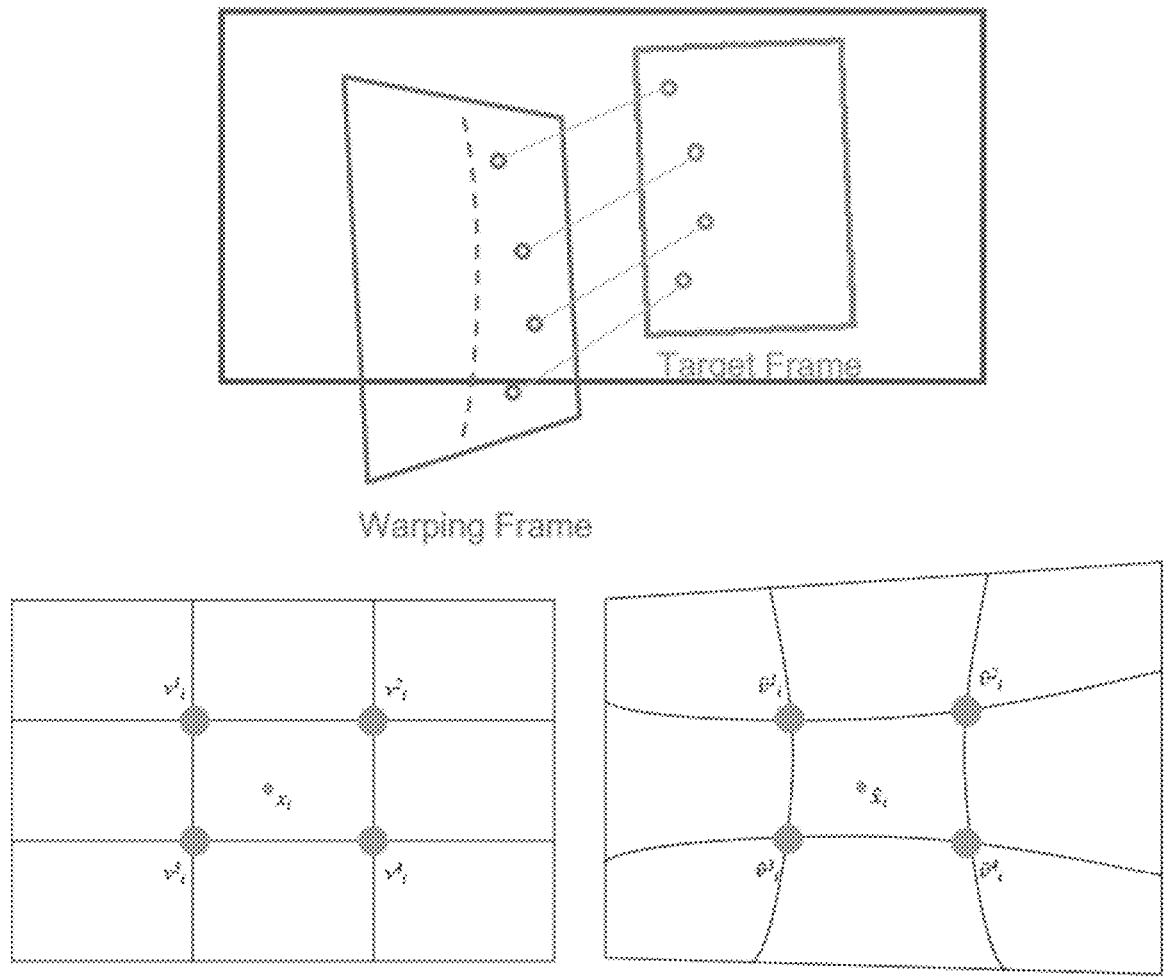
FIGS. 16-24 are representations of fine alignment.

2D point alignment constraints are satisfied for two images if corresponding 2D feature points on the images align on the overlapping region between the two images (but the actual location of the aligned points in the pano is left unconstrained). In variants, the vertices of the mesh grids that include the 2D feature points in the two images can be compared to determine if the points align (e.g., as shown in FIG. 16). FIG. 16 shows an example 2D point alignment constraint term $E_{pointMatch2D}$.

Figure 17:
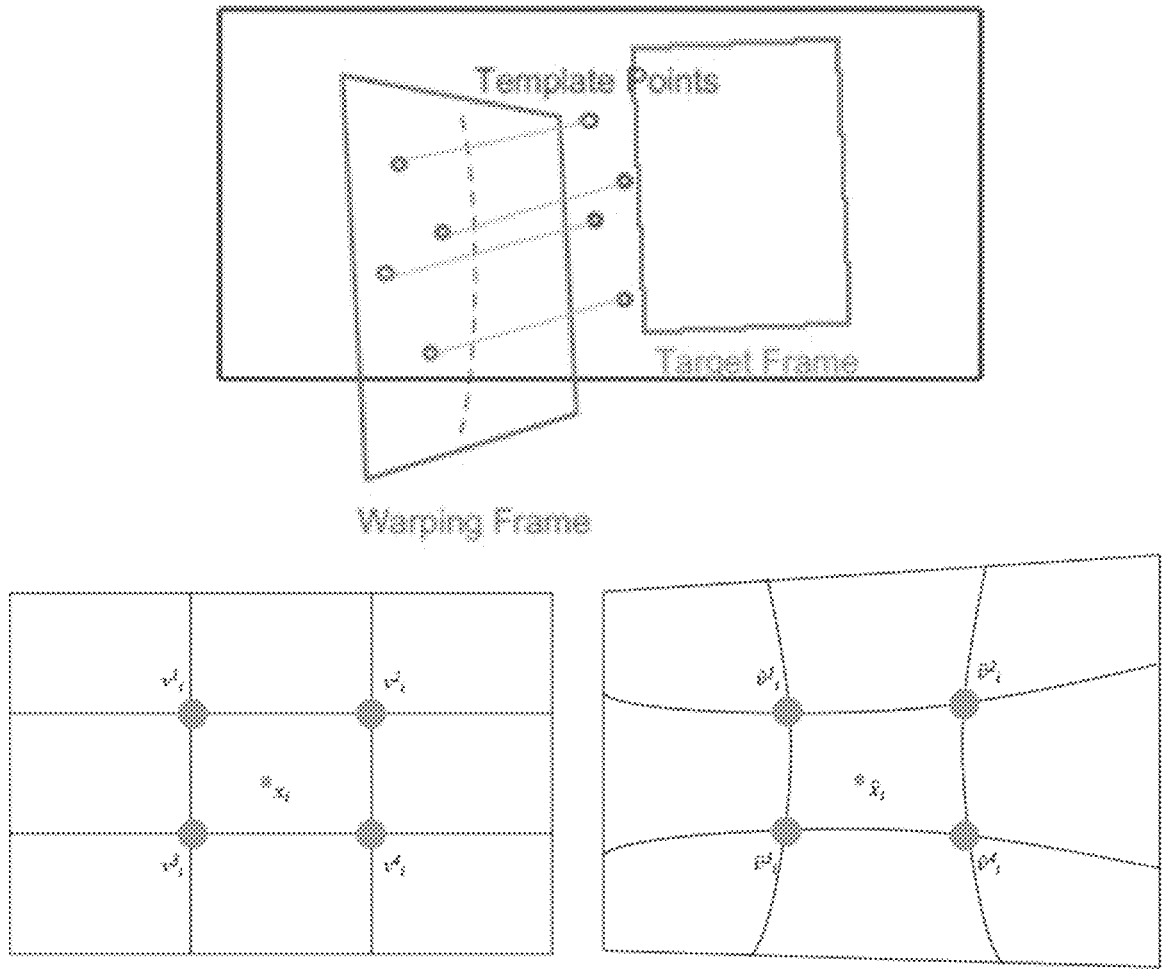

3D point alignment constraints are satisfied if corresponding 3D feature points are placed near the 3D correct location of the panoramic image. In some implementations, the 3D feature points (e.g., reconstructed by using SFM, MVS, etc.) are projected onto the panoramic image. In variants, the vertices of the mesh grid that include a 3D feature points in the image being warped can be compared with the vertices of the mesh grid that includes the 3D correct location to determine if the points align (e.g., as shown in FIG. 17). FIG. 17 shows an example 3D point alignment constraint term EpointMatch3D.

Figure 18:
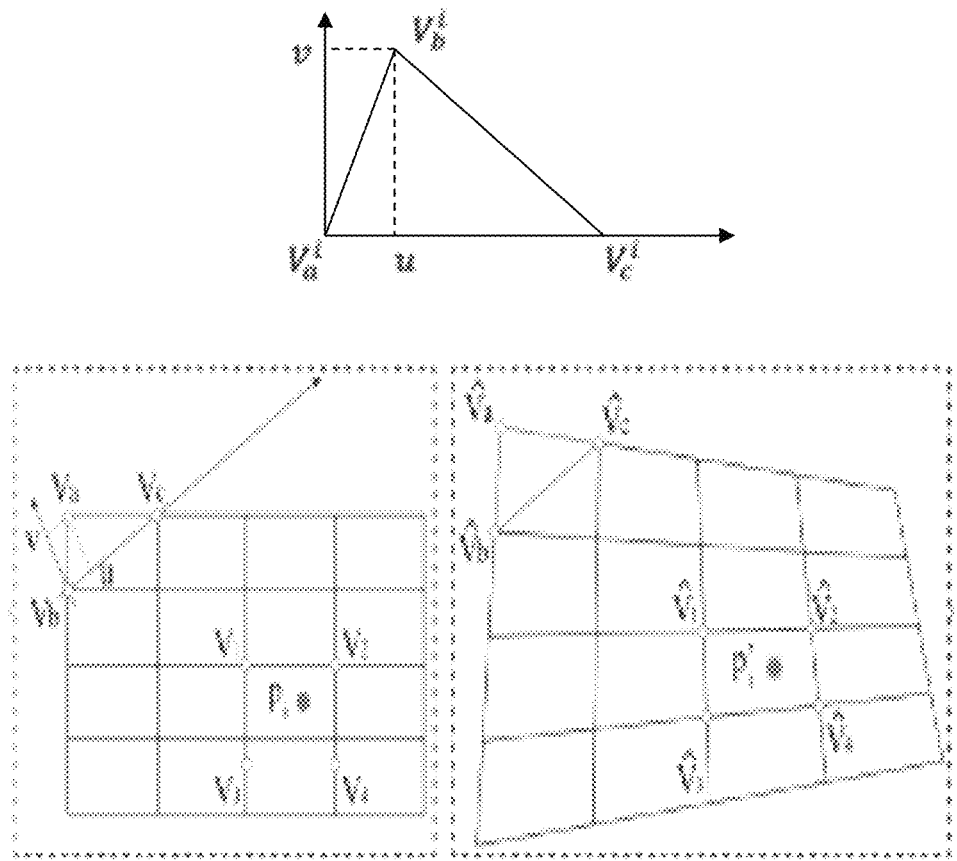

Cell shape constraints are satisfied if the vertices representing mesh grids are not deformed too strongly (e.g., move beyond a threshold distance from their initial positions), and do not deviate too strongly from the original shape (e.g., similarity or perspective shape transformation). In variants, determining whether a cell shape constraint is satisfied includes: dividing each mesh grid into two triangles, determining parameters for each triangle, identifying the updated triangle parameters after mesh warping, and comparing the initial triangle parameters with the updated triangle parameters. In some implementations, triangle parameters include or each triangle coordinates for each vertex, and optionally the values u and v (shown in FIG. 18) are computed. FIG. 18 shows an example cell shape constraint term $E_{sim}$.

Figure 19:
Figure 19:
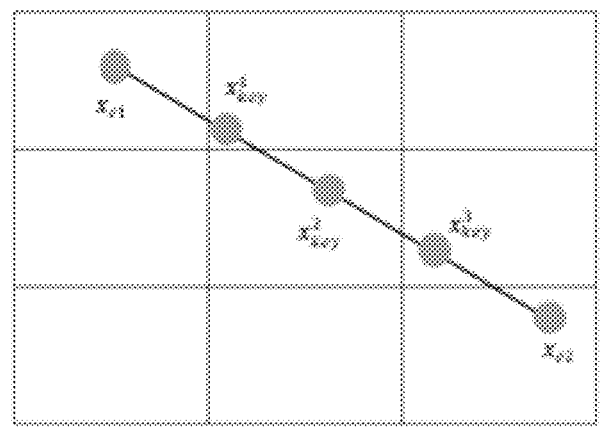
Figure 19:
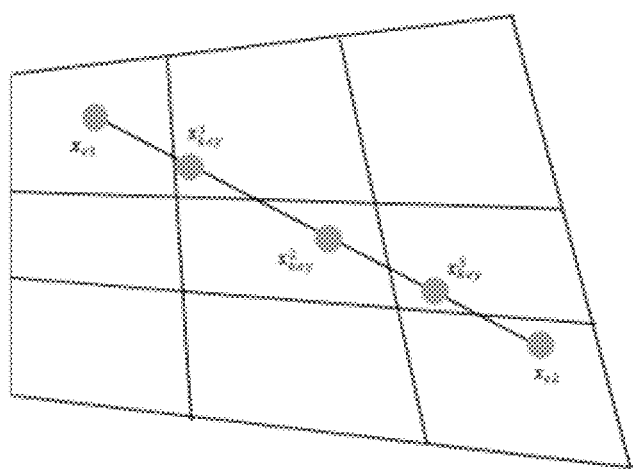

Line straightness constraints are satisfied if lines are straight after mesh warping. FIG. 19 shows an example line straightness constraint term $E_{line}$, wherein $x_{key}$ represents a keypoint.

Figure 20:
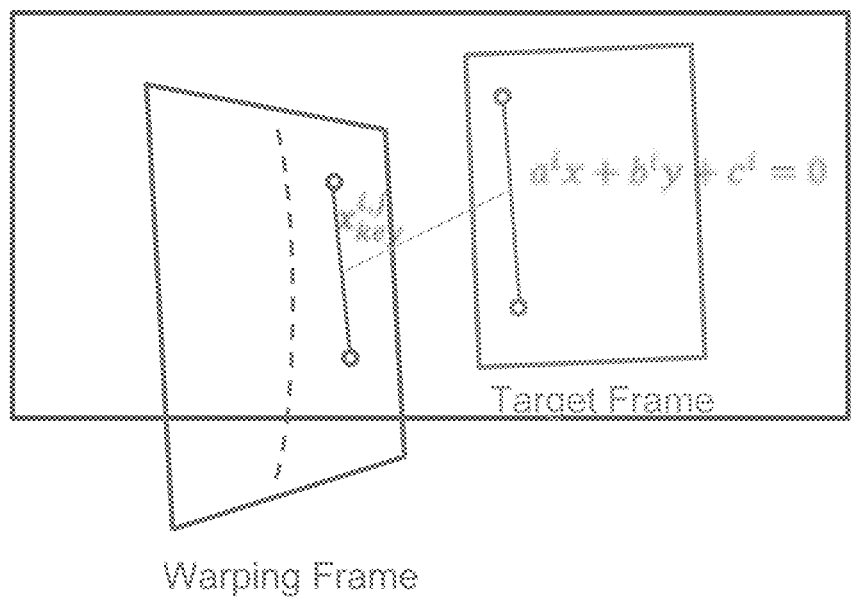

2D line alignment constraints are satisfied if matched segments align on an overlapping region. FIG. 20 shows an example 2D line alignment constraint term $E_{LineMatch2D}$.

Figure 21:
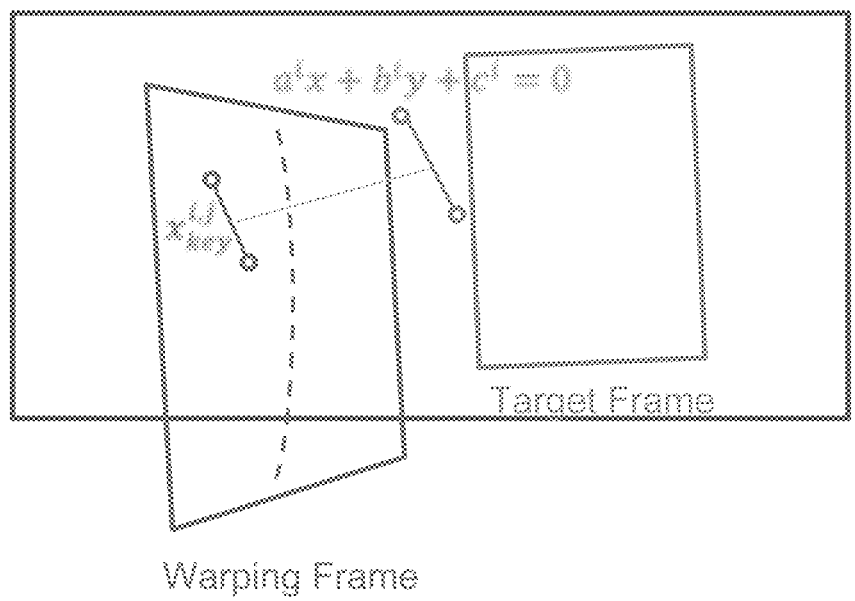

3D line alignment constraints are satisfied if 3D lines are placed near the correct 3D location in the target image plane. In variants, a 3D lines in a warped image is placed in a non-overlapping region with respect to a target image to which the warped image is being warped. In variants, 3D lines are reconstructed (e.g., by using SFM, MVS, line construction, etc.) and projected into the image plane of the pano image, in a region that does not overlap with the target image. FIG. 21 shows an example 3D line alignment constraint term $E_{LineMatch3D}$.

Figure 22:
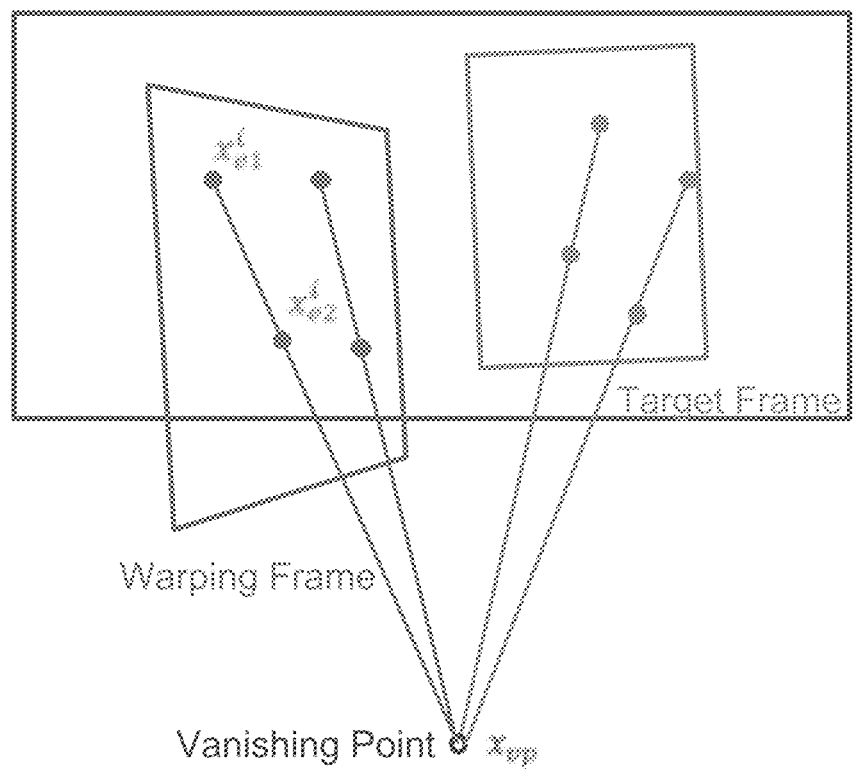

Vanishing point constraints are satisfied if a set of lines that share vanishing points in input images still share the same vanishing points in the pano image. FIG. 22 shows an example vanishing point constraint term $E_{vp}$.

Figure 23:
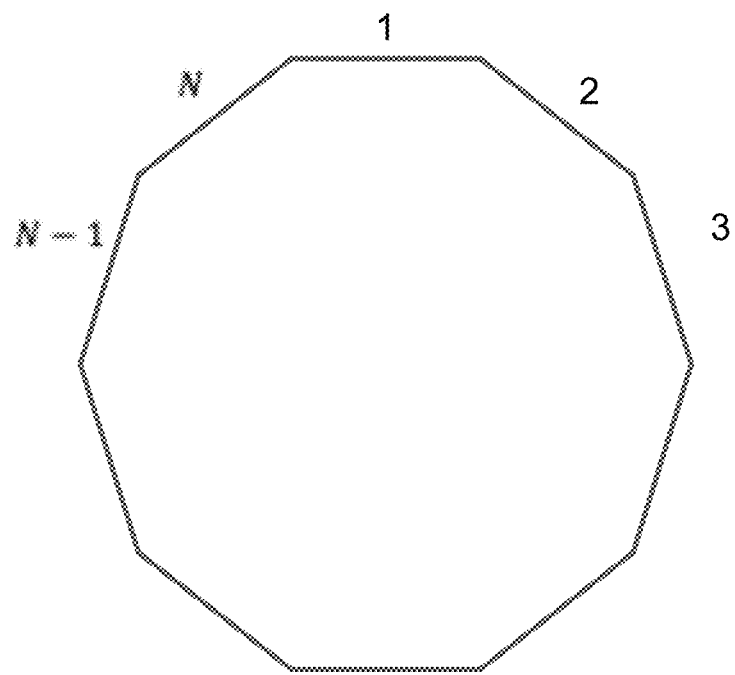

For 360 degree panoramic images, a loop closure constraint is satisfied if results of pairwise point (or line) feature matching between frames result in a closed loop (e.g., as shown in FIG. 23).

In some implementations, a 3D location of at least one point feature detected in the image whose vertices are being adjusted is identified (e.g., by using photogrammetry based on the set of captured images and the estimated camera pose data). Each point feature is projected onto an image plane of the adjacent image and the pano image plane by using at least the associated 3D location. For each point feature detected in the image whose vertices are being adjusted, to make the warped feature point position close to its projection in the pano image plane, a score is calculated that identifies whether the point feature in the image whose vertices are being adjusted is aligned with the corresponding projection in the pano image plane after the vertices have been adjusted. Such 3D location constraint is mainly applied on the non-overlapping regions when warping a new image into the pano image.

Geometry preservation constraints serve to reduce certain kinds of image distortions that cause meaningful or perceptible deviations (e.g., more than a predetermined threshold deviation) from realistic 3D geometry (e.g., determined from the set of images, determined from a database, determined from a set of rules or heuristics, etc.), of the sort that might hinder the use of panoramic images for 3D applications. Geometry preservation constraints can include encouraging (or penalizing deviation from, or forcing): some or all of the visible lines converging to vanishing points in the scene to stay convergent after deformation, some or all of the major vanishing points in the scene to be placed in the proper position in the final pano consistent with 3D geometry, certain features to reside at locations in the panorama that are consistent with 3D geometry, the locally warped pixels to not deviate excessively from the initial coarse warp (i.e. global shape constraints), mesh cells to not change excessively in size or shape (i.e. cell transformation constraints), vertical lines to not deviate excessively from gravity, or any other suitable constraints.

Photometric preservation constraints serve to align visual pixel (e.g. brightness, color, etc.) patterns, potentially even subtle texture, where classic distinctive features may not be found. Photometric preservation constraints can include encouraging (or penalizing deviation from, or forcing) pixels (or pixel parameter values) in a deformed mesh and reference image to be similar (e.g. by sum of absolute differences, sum of squared differences, cross correlation, statistical analysis, or any other suitable method of comparison), or any other suitable constraints.

Figure 5C:
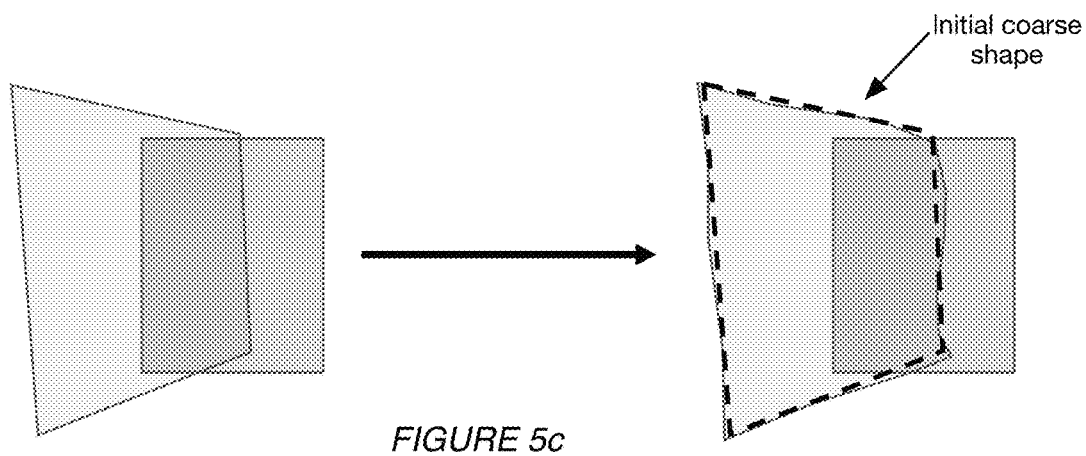
FIG. 5C is an example of S300 where the constraint to maintain the shape of the initial global shape is enforced.

Global shape constraints are forms of geometry preservation constraints that can include ensuring that the locally refined warped image maintain a similar shape as the initial global warping as shown in FIG. 5c (e.g., from S200), and can include penalizing the border mesh vertices from drifting away from initial locations. The initial locations can be the vertices' locations post-coarse adjustment (e.g., post-S200), be the vertices' location pre-coarse adjustment, be a target vertex location, or be any other suitable location. The initial locations can be relative to the image being warped, the reference image, a 3D coordinate system, a 2D coordinate system, and/or any other suitable reference frame. For example, enforcing global shape constraints can include enforcing the locally refined warp to maintain a similar shape as the initial global warping output by S200, but can additionally or alternatively include any other suitable constraints.

In one example, S300 can include creating a mesh of cells as shown in FIG. 5a where the vertices of the mesh are mapped to the final panorama coordinates. Individual pixels inside the mesh cells can be mapped to the final panorama parametrically via a parametric interpolation of the vertices of the mesh cell (e.g., at S340) (e.g. bilinear interpolation, barycentric coordinates of triangulated mesh, etc.) or any other method. An optimizer can be used (e.g. an energy-based gradient descent optimizer, a linear programming optimizer, etc.) to adjust the vertices of the mesh, optimizing for feature alignment between images and other constraints. The output data can be vertices of the mesh can have a locally-optimal energy of the competing constraints.

In some variations, after mesh warping, dense optical flow estimation and image warping can be applied to the aligned image to resolve remaining alignment artifacts. In some implementations, for a pair of images that have been finely aligned by mesh warping (e.g., a warping image that has been aligned with a target image), a dense optical flow is estimated. During optical flow estimation, a photometric loss is applied on the overlapping region between the two images to estimate a dense optical flow that minimizes photometric error. In variants, a spatial smoothness term is applied on the whole warping frame, to ensure a smooth motion field for the dense optical flow. In variants, the warped image is warped into the target image by using the estimated dense optical flow.

In some variations, optical flow from the warped image into the target image is computed to find the dense correspondence between pixels in the warped image and the target image.

Figure 25A:
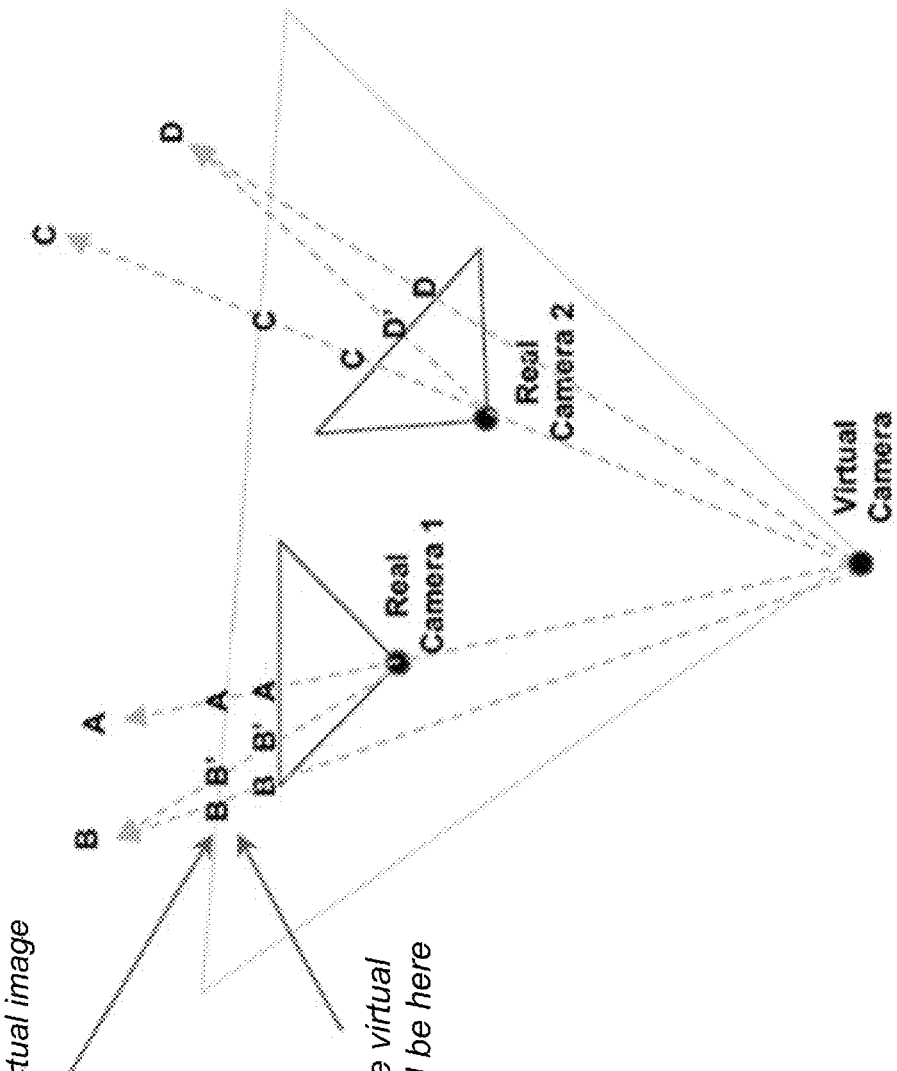
FIGS. 25A-B are representations of using virtual-real epipoles and slit scan techniques to select pixels that are more tolerant of parallax.
Figure 25B:
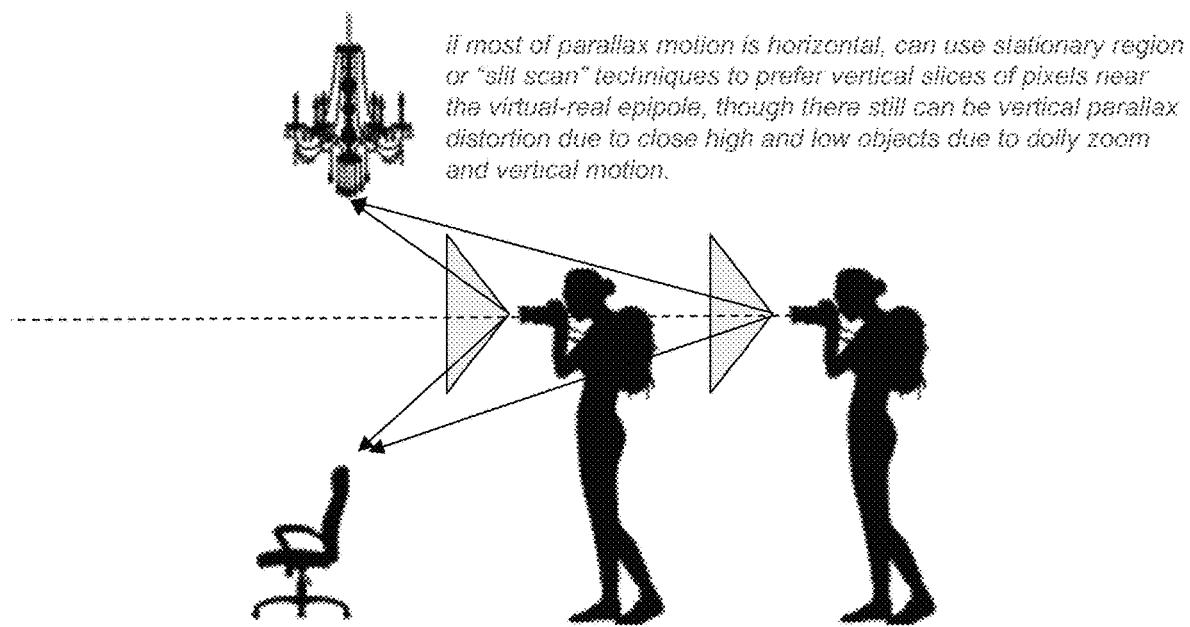

In some variations, final placement of a corresponded pair of points can be influenced by knowledge of parallax-stationary regions. Parallax-stationary regions are areas of the image that are less likely to be affected by parallax, because they are located close to the virtual-real epipole, because they lay along a line through the virtual-real epipole orthogonal to the dominant direction of motion (e.g., so-called "stationary curve" or "slit-scan" methods), because there are estimations of scene depth, etc. FIGS. 25A-B are representations of using virtual-real epipoles and slit scan techniques to select pixels that are more tolerant of parallax.

Figure 24:
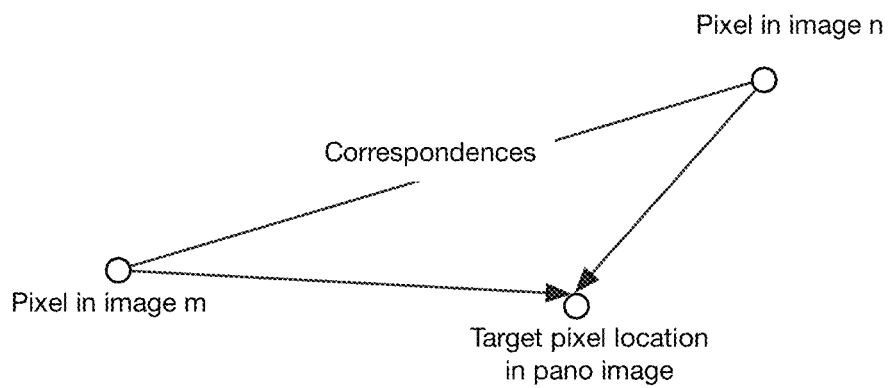

In some variations, based on the correspondences (e.g., identified at S210), the dense motion field from an image m and an image n into the pano image is computed, based on the vector illustration shown in FIG. 24. The target pixel location in a pano image can be either determined by some global point constraint (sparse to dense achieved by meshes), or simply in between pixels in image m and n. In some variations, the estimated dense optical flow is applied on the pixels in image m on the right side of its approximate stationary line to warp the image m to the pano image, and the estimated dense optical flow is applied on the pixels in image n on the left side of its approximate stationary curve. In some implementations, the dense optical flow field warping happens between two approximate stationary curves of image m and n. In some implementations, such warping is applied in parallel with all the consecutive image pairs. In some implementations, the geometry of the pano is preserved because i) target pixel location is determined by global projection and 2) approximate stationary curves in the middle of each slice (e.g, portion of the image) have the least amount of geometry distortion by initial slice homography warping.

5.4 Compositing Images into a Final Panorama.

The method preferably includes compositing images into a final panorama S400. S400 preferably functions to transform the coarsely and finely aligned images into a final wide-angle image (final panorama). The final panorama preferably has at least an 80 degree horizontal FOV, but can additionally or alternatively have any other suitable field of view horizontally or vertically.

S400 is preferably performed entirely by the computing system, more preferably the remote computing system, but can additionally or alternatively be partially or entirely performed by the device or any other suitable computing system. S400 is preferably performed entirely using the processing system, but can additionally or alternatively be performed partially or entirely using any other one or more data structures.

In some variations, S400 includes estimating a gravity vector for at least one image in the set of finely aligned images by using at least IMU date captured for the images obtained at S100, and adjusting orientation of at least one region in the set of finely aligned images to vertically align each estimated gravity vector to generate a set of gravity aligned images. In some variations, the gravity aligned images are composited into the final panorama. In some implementations, the final panorama is stored on a storage.

S400 preferably processes the locally-aligned images from S300, but can additionally or alternatively process any other suitable data. S400 can include blending, cropping, or otherwise modifying the images. Blending can include removing any visible edges when compositing the seam-carved images and/or blend pixels from overlapping images. Blending can be done in the image domain, the gradient domain, the frequency domain, or other formulations. The blending can additionally or alternatively include image normalization. Cropping can include making the final panorama rectangular for the desired horizontal and vertical field of view (e.g., according to a predetermined size, shape, etc.). However, S400 can additionally or alternatively include any other suitable elements performed in any suitable manner.

In variants, the method can additionally or alternatively include pixel selection. After alignment there will likely be some regions of overlapping aligned images that still disagree in color and luminance due to remaining parallax errors, dynamic moving objects in the scene, view-dependent lighting, or other factors. To handle these situations, local and global choices can be made for which pixels to blend together and which pixels to omit in the final composited panorama. Pixel selection techniques can include epipole-based stationary region estimations, confidence scores, and scene carving techniques, and the like.

Carving scenes preferably functions to determine remaining misalignments and prevent misaligned sections from multiple images from being blended (e.g., choosing pixels to keep, discard, etc.). Carving scenes is preferably performed after S300, but can additionally or alternatively be performed during or before.

The method can additionally or alternatively include carving scenes. Carving scenes preferably functions to determine remaining misalignments and prevent misaligned sections from multiple images from being blended (e.g., choosing pixels to keep, discard, etc.). Carving scenes is preferably performed after S300, but can additionally or alternatively be performed during or before.

In one variation, carving scenes is achieved with one or more graph cut techniques that can be coupled with one or more constraints (e.g., to decide the optimal seam location). The constraints are preferably different from those used to locally align the images, but can additionally or alternatively be the same or similar. The constraints can include preferring pixels from images close to the center image, preferring pixels in better focus or sharpness, preferring pixels from epipolar stationary regions, penalizing seams that cut through semantic segmentation boundaries, and any other suitable constraint. However, carving scenes can additionally or alternatively include any other suitable process performed in any suitable manner.

In one variation, most appropriate for horizontal or vertical "swipe captures", a larger number of images, video frames or still photo bursts are captured during a dominant directional motion, and stitched strongly biasing pixel selection to a narrow slit of pixels around the epipole stationary region with optical flow techniques used to resolve the small alignment errors.

The system and method of the preferred embodiment and variations thereof can be embodied and/or implemented at least in part as a machine configured to receive a computer-readable medium storing computer-readable instructions. The instructions are preferably executed by computer-executable components preferably integrated with the system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can additionally or alternatively execute the instructions.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures, modifications and changes can be made to the preferred embodiments of the invention without departing from the scope of this invention.

We claim:

1. A method executed by one or more computing devices of an image processing platform for generating a panorama image, the method comprising:
   capturing, with an image sensor of the image processing platform, video;
   displaying, with a display device of the image processing platform, the video in real-time;
   with the mobile device, performing guided image capture to automatically capture a set of captured images using the image sensor during display of the video, wherein performing guided image capture comprises:
      superimposing a plurality of image centering targets onto the displayed video, each image centering target being associated with an image index;
      automatically capturing images of scenes that include a centered image centering target; and
      for each captured image, assigning the image index of the centered image centering target to the image;
   coarsely aligning the set of captured images in accordance with the assigned image indexes to generate a set of coarsely aligned images;
   finely aligning pairs of images in the set of coarsely aligned images to generate a set of finely aligned images, comprising, for at least one image in the set of coarsely aligned images:
      dividing the image into one or more depth-stacked image layers,
      dividing each image layer into a mesh of cells, defined by 2D cell vertices,
      adjusting cell vertices to maximize a combination of constraint values including at least a feature constraint value and a global shape anchor constraint value, and
      warping the image in accordance with the adjusted cell vertices to generate a finely warped image;
   generating the panorama image by using the finely aligned images; and
   storing the panorama image in a storage device.

2. The method of claim 1, further comprising:
identifying a center image in the set of captured images, based on the assigned image indexes;
wherein coarsely aligning the captured images comprises projecting each non-center image in the set of captured images onto an image plane of the center image.

3. The method of claim 2, wherein automatically capturing a set of captured images comprises:
simultaneously capturing IMU (inertial measurement unit) data for each captured image by using an IMU of the mobile device;
wherein generating the panorama image by using the finely aligned images comprises:
estimating a gravity vector for at least one image in the set of finely aligned images by using at least the captured IMU data;
adjusting orientation of at least one region in the set of finely aligned images to vertically align each estimated gravity vector to generate a set of gravity aligned images; and
compositing the set of gravity aligned images into the panorama image.

4. The method of claim 3, wherein coarsely aligning the captured images further comprises:
for each non-center image, identifying feature correspondences between features in the non-center image and features in an adjacent image that is in the image plane of the center image;
wherein projecting the non-center image comprises:
determining one or more transformations by using the identified feature correspondences; and
applying one or more determined transformations to the non-centered images to generate a warped image; and
wherein coarsely aligning the captured images further comprises aligning each warped image with the corresponding adjacent image such that features included in the warped image align with the corresponding features in the corresponding adjacent image.

5. The method of claim 4, wherein identifying correspondences between features comprises:
detecting at least one feature in the non-center image; and
performing video-based motion tracking to track each detected to a location in the adjacent image.

6. The method of claim 4, wherein identifying correspondences between features comprises:
detecting at least one feature in the non-center image; and
identifying correspondences between features by performing feature matching.

7. The method of claim 6, wherein detecting at least one feature in the non-center image comprises:
detecting at least one line segment;
wherein performing feature matching comprises performing line segment matching; and
wherein performing line segment matching comprises accessing a semantic segmentation context for each line feature and comparing the semantic segmentation context of the line features being compared.

8. The method of claim 7, wherein adjusting vertices comprises:
generating one or more sets of adjusted vertices; and
for each set of adjusted vertices:
calculating each constraint value;
calculating a combined constraint value by combining the calculated constrain values; and
selecting a set of adjusted vertices having a highest combined constraint value.

9. The method of claim 8, wherein calculating a feature constraint value for a set of adjusted vertices comprises:
calculating a score that identifies whether a line segment feature in an overlapping region of an image whose vertices are being adjusted is collinear with a corresponding line segment feature in an adjacent image after the vertices have been adjusted.

10. The method of claim 9, wherein calculating a feature constraint value for a set of adjusted vertices further comprises:
identifying a 3D location of at least one point feature detected in the image whose vertices are being adjusted, by using the set of captured images and the captured IMU data;
projecting each point feature onto an image plane of the adjacent image by using at least the associated 3D location; and
for each point feature detected in the image whose vertices are being adjusted, calculating a score that identifies whether the point feature in the image whose vertices are being adjusted is aligned with the corresponding projection in the image plane of the adjacent image after the vertices have been adjusted.

11. The method of claim 10, wherein calculating a global shape anchor constraint value for a set of adjusted vertices comprises:
calculating a value that identifies a difference between a location of each pre-adjustment vertex and the corresponding adjusted vertex location;
wherein coarsely aligning the set of captured images comprises using virtual-real epipoles to estimate stationary regions within the set of captured images and select pixels for compositing.

12. The method of claim 11, wherein finely aligning pairs of images comprises performing multi-layer mesh warping using a plurality of mesh layers corresponding to a respective depth.

13. A method executed by one or more computing devices of an image processing platform for generating a panorama image, the method comprising:
receiving a set of captured images and an assigned image index for each image in the set of captured images from a mobile device;
identifying a center image in the set of captured images based on the assigned image indexes;
coarsely aligning the set of captured images to generate a set of coarsely aligned images, wherein coarsely aligning the captured images comprises projecting each non-center image in the set of captured images onto an image plane of the center image;
finely aligning pairs of images in the set of coarsely aligned images to generate a set of finely aligned images, comprising, for at least one image in the set of coarsely aligned images:
dividing the image into one or more depth-stacked image layers,
dividing each image layer into a mesh of cells, defined by 2D cell vertices,
adjusting cell vertices to maximize a combination of constraint values including at least a feature constraint value and a global shape anchor constraint value, and
warping the image in accordance with the adjusted cell vertices to generate a finely warped image;
generating the panorama image by using the finely aligned images; and
transmitting the panorama image to the mobile device.

14. The method of claim 13, wherein adjusting cell vertices comprises:
generating one or more sets of adjusted vertices; and
for each set of adjusted vertices:
calculating each constraint value;
calculating a combined constraint value by combining the calculated constrain values; and
selecting a set of adjusted vertices having a highest combined constraint value.

15. The method of claim 14, wherein calculating each constraint value comprises:
calculating a score that identifies whether a line segment feature in an overlapping region of an image whose vertices are being adjusted is collinear with a corresponding line segment feature in an adjacent image after the vertices have been adjusted.

16. The method of claim 13, further comprising:
receiving IMU data for each image in the set of captured images from the mobile device, wherein calculating a feature constraint value for a set of adjusted vertices further comprises:
identifying a 3D location of at least one point feature detected in the image whose vertices are being adjusted, by using the set of captured images and the IMU data;
projecting each point feature onto an image plane of the adjacent image by using at least the associated 3D location; and
for each point feature detected in the image whose vertices are being adjusted, calculating a score that identifies whether the point feature in the image whose vertices are being adjusted is aligned with the corresponding projection in the image plane of the adjacent image after the vertices have been adjusted.

17. The method of claim 16, wherein calculating a global shape anchor constraint value for a set of adjusted vertices comprises:
calculating a value that identifies a difference between a location of each pre-adjustment vertex and the corresponding adjusted vertex location.

18. An image processing apparatus for generating a panorama image, the apparatus comprising:
one or more processors; and
one or more memories operatively coupled to at least one of the one or more processors and having instructions stored thereon that, when executed by at least one of the one or more processors, cause at least one of the one or more processors to:
capture, with an image sensor of the image processing apparatus, video;
display, with a display device of the image processing apparatus, the video in real-time;
perform guided image capture to automatically capture a set of captured images using the image sensor during display of the video, wherein performing guided image capture comprises:
superimposing a plurality of image centering targets onto the displayed video, each image centering target being associated with an image index;
automatically capturing images of scenes that include a centered image centering target; and
for each captured image, assigning the image index of the centered image centering target to the image;
coarsely align the set of captured images in accordance with the assigned image indexes to generate a set of coarsely aligned images;
finely align pairs of images in the set of coarsely aligned images to generate a set of finely aligned images, comprising, for at least one image in the set of coarsely aligned images:
dividing the image into one or more depth-stacked image layers,
dividing each image layer into a mesh of cells, defined by 2D cell vertices,
adjusting cell vertices to maximize a combination of constraint values including at least a feature constraint value and a global shape anchor constraint value, and
warping the image in accordance with the adjusted cell vertices to generate a finely warped image;
generate the panorama image by using the finely aligned images; and
store the panorama image in a storage device.

19. An image processing apparatus for generating a panorama image, the apparatus comprising:
one or more processors; and
one or more memories operatively coupled to at least one of the one or more processors and having instructions stored thereon that, when executed by at least one of the one or more processors, cause at least one of the one or more processors to:
receive a set of captured images and an assigned image index for each image in the set of captured images from a mobile device;
identify a center image in the set of captured images based on the assigned image indexes;
coarsely align the set of captured images to generate a set of coarsely aligned images, wherein coarsely aligning the captured images comprises projecting each non-center image in the set of captured images onto an image plane of the center image;
finely align pairs of images in the set of coarsely aligned images to generate a set of finely aligned images, comprising, for at least one image in the set of coarsely aligned images:
dividing the image into one or more depth-stacked image layers;
dividing each image layer into a mesh of cells, defined by 2D cell vertices;
adjusting cell vertices to maximize a combination of constraint values including at least a feature constraint value and a global shape anchor constraint value; and
warping the image in accordance with the adjusted cell vertices to generate a finely warped image;
generate the panorama image by using the finely aligned images; and
transmit the panorama image to the mobile device.

20. At least one non-transitory computer-readable medium storing computer- readable instructions for generating a panorama image that, when executed by one or more computing devices, cause at least one of the one or more computing devices to:
capture, with an image sensor of the image processing apparatus, video;
display, with a display device of the image processing apparatus, the video in real-time;
perform guided image capture to automatically capture a set of captured images using the image sensor during display of the video, wherein performing guided image capture comprises:

superimposing a plurality of image centering targets onto the displayed video, each image centering target being associated with an image index;

automatically capturing images of scenes that include a centered image centering target; and for each captured image, assigning the image index of the centered image centering target to the image;

coarsely align the set of captured images in accordance with the assigned image indexes to generate a set of coarsely aligned images;

finely align pairs of images in the set of coarsely aligned images to generate a set of finely aligned images, comprising, for at least one image in the set of coarsely aligned images:
- dividing the image into one or more depth-stacked image layers,
- dividing each image layer into a mesh of cells, defined by 2D cell vertices,
- adjusting cell vertices to maximize a combination of constraint values including at least a feature constraint value and a global shape anchor constraint value, and
- warping the image in accordance with the adjusted cell vertices to generate a finely warped image;

generate the panorama image by using the finely aligned images; and store the panorama image in a storage device.

21. At least one non-transitory computer-readable medium storing computer-readable instructions for generating a panorama image that, when executed by one or more computing devices, cause at least one of the one or more computing devices to:

receive a set of captured images and an assigned image index for each image in the set of captured images from a mobile device;

identify a center image in the set of captured images based on the assigned image indexes;

coarsely align the set of captured images to generate a set of coarsely aligned images, wherein coarsely aligning the captured images comprises projecting each non-center image in the set of captured images onto an image plane of the center image;

finely align pairs of images in the set of coarsely aligned images to generate a set of finely aligned images, comprising, for at least one image in the set of coarsely aligned images:
- dividing the image into one or more depth-stacked image layers,
- dividing each image layer into a mesh of cells, defined by 2D cell vertices,
- adjusting cell vertices to maximize a combination of constraint values including at least a feature constraint value and a global shape anchor constraint value, and
- warping the image in accordance with the adjusted cell vertices to generate a finely warped image;

generate the panorama image by using the finely aligned images; and transmit the panorama image to the mobile device.

\* \* \* \* \*